US012295280B2

(12) United States Patent
Krainer

(10) Patent No.: US 12,295,280 B2
(45) Date of Patent: May 13, 2025

(54) SEED JEWELRY FOR AGRICULTURE

(71) Applicant: GROW MORE FOUNDATION, Stony Brook, NY (US)

(72) Inventor: Kate Creasey Krainer, Stony Brook, NY (US)

(73) Assignee: Grow More Foundation, Stony Brook, NY (US)

( * ) Notice: Subject to any disclaimer, the term of this patent is extended or adjusted under 35 U.S.C. 154(b) by 810 days.

(21) Appl. No.: 17/609,514

(22) PCT Filed: May 8, 2020

(86) PCT No.: PCT/US2020/032105
§ 371 (c)(1),
(2) Date: Nov. 8, 2021

(87) PCT Pub. No.: WO2020/227634
PCT Pub. Date: Nov. 12, 2020

(65) Prior Publication Data
US 2022/0225559 A1 Jul. 21, 2022

Related U.S. Application Data

(60) Provisional application No. 62/971,375, filed on Feb. 7, 2020, provisional application No. 62/845,618, filed on May 9, 2019.

(51) Int. Cl.
*A01C 1/04* (2006.01)
*A44C 5/00* (2006.01)
(52) U.S. Cl.
CPC ............ *A01C 1/042* (2013.01); *A44C 5/0007* (2013.01)

(58) Field of Classification Search
CPC .. A01C 1/042; A01C 1/04; A01C 1/00; A44C 5/07; A44C 5/00
See application file for complete search history.

(56) References Cited

U.S. PATENT DOCUMENTS

| | | |
|---|---|---|
| 4,118,889 A | 10/1978 | Lamlee |
| 4,418,497 A | 12/1983 | Mastriano |
| 4,877,738 A | 10/1989 | Handelsman et al. |
| 4,910,911 A | 3/1990 | Ahm |
| 2002/0040670 A1 | 4/2002 | Hornak |
| 2004/0168232 A1 | 8/2004 | Groth et al. |
| 2005/0150252 A1 | 7/2005 | Renter |
| 2006/0010913 A1 | 1/2006 | Torres et al. |
| 2006/0107561 A1 | 5/2006 | Menzie et al. |
| 2006/0231609 A1 | 10/2006 | Lazarowicz et al. |
| 2013/0074545 A1 | 3/2013 | Moloney |

(Continued)

OTHER PUBLICATIONS

Bellarby et al., "The stocks and flows of nitrogen, phosphorus and potassium across a 30-year time series for agriculture in Huantai county, China," Science of the Total Environment 619-620 (2018) 606-620.

(Continued)

*Primary Examiner* — Christopher J. Novosad
(74) *Attorney, Agent, or Firm* — COOLEY LLP

(57) ABSTRACT

Jewelry for planting crops contains a post used to fashion the jewelry to a body part, markings adoring the jewelry at defined distances that specify how to plant crops, and a support material for holding the markings. Spacings within the jewelry define where to add water and fertilizer to soil and where to plant seeds.

19 Claims, 23 Drawing Sheets

(56) References Cited

U.S. PATENT DOCUMENTS

2016/0174457 A1    6/2016    Lynch

OTHER PUBLICATIONS

Brandon, George, "The Uses Of Plants In Healing In An Afro-Cuban Religion, Santeria," Journal of Black Studies 22(1):55-76 (1991).
Coates, D., "Analyzing and Optimizing Discretionary Information," Design Management Journal, pp. 58-65 (1997).
Delmer,"Agriculture in the developing world: Connectinginnovations in plant research to downstream applications," pnas 102(44):15379-15746.
Diiro et al., "Women's empowerment in agriculture and agricultural productivity: Evidence from rural maize farmer households in western Kenya," PLoS ONE 13(5): e0197995, pp. 1-27 (2018).
Dobarco, M.R. et al., Pedotransfer functions for predicting available water capacity in French soils, their applicability domain and associated uncertainty, Geoderma 336:81-95 (2019).
Doss, C. et al., "Women in agriculture: Four myths," Global Food Security 16:69-74 (2018).
International Search Report and Written Opinion issued by the International Searching Authority for Application No. PCT/US2020/032105, dated Aug. 27, 2020, 9 pages.
Kogan et al., "Drought and food security prediction from NOAA new generation of operational satellite," Geomatics, Natural Hazards and Risk 10(1):651-666 (2019). DOI: 10.1080/19475705.2018.1541257.
Laible, K., "A Marriage of Art and Science to Address Global Food Insecurity: Planting Seed Jewelry," Synchronocity. Nov. 23, 2019 (Nov. 23, 2018) [online], 8 pages [retrieved on Aug. 5, 2020). Retrieved from the internet: <url: <a=""href="https://www.synchronicitypc.com/blog/a">https://www.synchronicitypc.com/blog/a-</url:>marriage-of-art-and-science-to-address-global-food-insecurity-plantingseed-jewelry.
Leenaars, J.G.B. et al., "Mapping rootable depth and root zone plant-available water holding capacity of the soil of sub-Saharan Africa," Geoderma 324:18-36 (2018).
Loughton, A. et al., "Yield and growth responses of asparagus to between-row spacing and planting depth," Can. J. Plant Sci. 76:841-847 (1996).
Macedo et al., Potential worldwide distribution of Fusarium dry root rot in common beans based on the optimal environment for disease occurrence. PLoS ONE 12(11): e0187770, pp. 1-19 (2017).
"Our Priorities—The Strategic Objectives of FAO," Rome. Food and Agriculture Organization of the United Nations (FOA) 2019, 28 pages.
Placide, R. et al., "Farmers' Perceptions, Production and Productivity Constraints, Preferences, and Breeding Priorities of Sweetpotatoin Rwanda," HORTSCIENCE 50(1):36-43 (2015).
Proctor, J. T.A. et al., "Effect of seeding depth on seedling growth and dry matter partitioning in American ginseng," J Ginseng Res 37(2):254-260 (2013).
Roy, R.C. et al., "Effect of planting bed shape, mulch and soil density onroot yield and shape in North American ginseng (*Panax quinquefolius* L.)," Can. J. Plant Sci. 88:937- 949 (2008).
Salami et al., "Smallholder Agriculture in East Africa: Trends, Constraints andOpportunities," African Development Bank Group, Working Paper No. 105, 52 pages (2010).
Sibhatu, K, Rural food security, subsistence agriculture, and seasonality. PLoS ONE 12(10): e0186406, pp. 1-15 (2017).

SEED JEWELRY FOR AGRICULTURE

CROSS-REFERENCE TO RELATED APPLICATIONS

This application is a national stage entry of International Application No. PCT/US2020/032105, filed on May 8, 2020, which claims the benefit of priority to U.S. Provisional Application No. 62/845,618, filed on May 9, 2019 and U.S. Provisional Application No. 62/971,375, filed on Feb. 7, 2020. These applications are incorporated by reference herein in their entirety for all purposes.

BACKGROUND OF THE DISCLOSURE

In 2019, the Food and Agriculture Organization of the United Nations reported that the absolute number of undernourished people has risen to over 800 million (FAO). A lack of access to healthy food contributes to undernutrition and additionally to obesity, highlighting the importance of growing more nutritious crops.

Climate variability and extremes have had a large impact on global hunger and are one of the leading causes of severe food crises. Since the early 1990s, the number of climate-related natural disasters, including droughts, extreme heat, and floods and storms have doubled, devastating agricultural productivity by leading to shortfalls in food availability and causing trickle down effects that result in food price hikes and income losses that reduce people's access to food.

Climate extremes undermine the production of major crops in tropical regions, and as temperatures increase, this is expected to worsen. Food security and nutrition are correlated to extreme climate events, such as severe drought, which severely impairs crop production. Drought leads to more than 80% of the total damage losses in agriculture.

Finding a solution to the food security crisis requires a focus on resilience and context-specific interventions aimed at limiting the effects of climate variability on crop growth. Family farms occupy around 70-80% of farm land worldwide; and, family farmers have the ability to contribute to food security due to the variety of food that they produce. Over 80% of food in developing countries is produced by small-scale producers, especially by women and girls. In many developing countries, the agriculture sector is underperforming because of gender inequality. Women are not given land ownership, access to credit and productive farm inputs, or access to agricultural resources and services.

There is an unmet need in the field to improve the ability of small-scale producers to grow crops. Improvements in the ability of small-scale producers to grow crops will lead to a decrease in world hunger, food insecurity, and malnutrition.

SUMMARY OF THE DISCLOSURE

To answer this unmet need, the present inventors developed seed jewelry for agriculture. The seed jewelry described in this disclosure teaches planters how to plant crops from seeds or slips. The underlying design principles of the jewelry specify planting parameters, including the depth of planting a seed (d), the spacing between adjacent seeds called the intrarow planting parameter (o), the spacing between rows called the interrow planting parameter (e), and the location for adding water and fertilizer called the water fertilizer parameter (wf). Alternative designs of the jewelry specify parameters for planting during drought conditions. The jewelry can be utilized by small-scale producers to enhance crop production.

In some aspects, the disclosure teaches an article of manufacture (e.g. jewelry), compositions, kits, and methods.

In some aspects, the instant disclosure is drawn to jewelry for planting crops, comprising: a post, used to fasten jewelry to a body part; markings adorning the jewelry at defined distances that specify how to plant crops; and a support material for holding the markings.

In some embodiments, the instant invention is drawn to an earring for planting crops, comprising: a post, used to fasten jewelry to a body part; markings adorning the jewelry at defined distances that specify how to plant crops; and a support material for holding the markings.

In some embodiments, the instant disclosure is drawn to an earring for planting crops, comprising: a post, a marking selected from the group consisting of jewels, seashells, and beads; and a support material called a dangle, wherein the dangle connects the post to the marking, and wherein a length of the dangle instructs a depth (d) of planting a seed in soil.

In some embodiments, the instant disclosure is drawn to an earring for planting crops, comprising: a post, a marking selected from the group consisting of jewels, seashells, and beads; and a support material called a dangle, wherein the dangle connects the post to the marking, and wherein a length of the dangle instructs a depth (d) of planting a seed in soil, and the length of the dangle (d) is an optimal length for planting seeds in drought.

In some embodiments, the instant disclosure is drawn to an earring for planting crops, comprising: a post, a marking selected from the group consisting of jewels, seashells, and beads; and a support material called a dangle, wherein the dangle connects the post to the marking, and wherein a length of the dangle instructs a depth (d) of planting a seed in soil, and the length of the dangle (d) is an optimal length for planting seeds.

In some embodiments, the instant disclosure is drawn to an earring for planting crops, comprising: a post, a marking selected from the group consisting of jewels, seashells, and beads; and a support material called a dangle, wherein the dangle connects the post to the marking, and wherein a length of the dangle instructs a depth (d) of planting a seed in soil, and the length of the dangle (d) is between 2.5 and 11 cm.

In some embodiments, the instant disclosure is drawn to an earring for planting crops, comprising: a post, a marking selected from the group consisting of jewels, seashells, and beads; and a support material called a dangle, wherein the dangle connects the post to the marking, and wherein a length of the dangle instructs a depth (d) of planting a seed in soil, and the length of the dangle serves as the radius of a circle with a circumference (C); and wherein the circumference defines where to add water and fertilizer to the soil.

In some embodiments of the disclosure, the earring is utilized to plant tomatoes, carrots, rice, soy beans, and wheat.

In some embodiments, the instant disclosure is drawn to a method of using the dangle of an earring, comprising: a post, a marking selected from the group consisting of jewels, seashells, and beads; and a support material called a dangle, wherein the dangle connects the post to the marking, to plant a seed at a depth (d) in the soil.

In some embodiments, the instant disclosure is drawn to a method of using the dangle of an earring, comprising: a post, a marking selected from the group consisting of jewels, seashells, and beads; and a support material called a dangle, wherein the dangle connects the post to the marking, to plant a seed at a depth (d) in the soil, wherein the dangle has an optimal length for planting seeds in drought.

In some embodiments, the instant disclosure is drawn to a method of using the dangle of an earring, comprising: a post, a marking selected from the group consisting of jewels, seashells, and beads; and a support material called a dangle, wherein the dangle connects the post to the marking, to plant a seed at a depth (d) in the soil, wherein the dangle has a length between 1 and 15 cm.

In some embodiments, the instant disclosure is drawn to a method of using the dangle of an earring, comprising: a post, a marking selected from the group consisting of jewels, seashells, and beads; and a support material called a dangle, wherein the dangle connects the post to the marking, to plant a seed at a depth (d) in the soil, wherein the dangle has a length between 2.5 and 11 cm.

In some embodiments, the instant disclosure is drawn to a method of using the dangle of an earring, comprising: a post, a marking selected from the group consisting of jewels, seashells, and beads; and a support material called a dangle, wherein the dangle connects the post to the marking, to plant a seed at a depth (d) in the soil, wherein the length of the dangle serves as the radius of a circle with a circumference (C); and wherein the circumference defines where to add water and fertilizer to the soil.

In some embodiments, the instant invention is drawn to a bracelet for planting crops, comprising: a post, used to fasten jewelry to a body part; markings adorning the jewelry at defined distances that specify how to plant crops; and a support material for holding the markings.

In some embodiments, the instant invention is drawn to a bracelet for planting crops, comprising: a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, and wherein a distance between the center of the circle and the outer circumference defines a spacing between seeds in a row called an intrarow planting parameter (o).

In some embodiments, the instant invention is drawn to a bracelet for planting crops, comprising: a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, and wherein a distance between the center of the circle and the outer circumference defines a spacing between seeds in a row called an intrarow planting parameter (o), and wherein markings are utilized to determine where to add water and fertilizer.

In some embodiments, the instant invention is drawn to a bracelet for planting crops, comprising: a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, and wherein a distance between the center of the circle and the outer circumference defines a spacing between seeds in a row called an intrarow planting parameter (o), and wherein the diameter of the inner circumference instructs a depth (d) of planting a seed in soil in drought.

In some embodiments, the instant invention is drawn to a bracelet for planting crops, comprising: a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, and wherein a distance between the center of the circle and the outer circumference defines a spacing between seeds in a row called an intrarow planting parameter (o), and wherein the radius of the outer circumference instructs a depth (d) for planting seeds.

In some embodiments, the instant invention is drawn to a bracelet for planting crops, comprising: a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, and wherein a distance between the center of the circle and the outer circumference defines a spacing between seeds in a row called an intrarow planting parameter (o), and wherein the radius of the outer circumference is between 2.5 and 7.5 cm.

In some embodiments, the instant invention is drawn to a bracelet for planting crops, comprising: a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, and wherein a distance between the center of the circle and the outer circumference defines a spacing between seeds in a row called an intrarow planting parameter (o), and wherein the inner diameter is between 4.5 and 7.5 cm.

In some embodiments, the instant invention is drawn to a bracelet for planting crops, comprising: a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, and wherein a distance between the center of the circle and the outer circumference defines a spacing between seeds in a row called an intrarow planting parameter (o), wherein said bracelet is utilized to plant soy, wheat, rice, lettuce, or tomatoes.

In some embodiments, the instant disclosure is directed to a method for planting using a bracelet comprising a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, comprising: utilizing the markings to determine where to add water and fertilizer, and using a distance between the outer circumference and the center of the circular band as a spacing between seeds in a row called an intrarow planting parameter (o).

In some embodiments, the instant disclosure is directed to a method for planting using a bracelet comprising a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, comprising utilizing the radius of the outer circumference to plant a seed a depth (d) in soil.

In some embodiments, the instant disclosure is directed to a method for planting using a bracelet comprising a post, used to fasten jewelry to a body part; markings selected from the group consisting of jewels, seashells, and beads; and a support material called a circular band, wherein an outer circumference is formed by drawing a circle connecting the markings protruding from the outside of the circular band, and wherein an inner circumference is formed by drawing a circle connecting the markings protruding from the inside of the circular band, comprising utilizing the diameter of the inner circumference to plant a seed a depth (d) in soil in drought conditions.

In some embodiments, the instant invention is drawn to a bangle for planting crops, comprising: a post, used to fasten jewelry to a body part; markings adorning the jewelry at defined distances that specify how to plant crops; and a support material for holding the markings.

In some embodiments, the instant invention is drawn to a bangle for planting crops, comprising: a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o).

In some embodiments, the instant invention is drawn to a bangle for planting crops, comprising: a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), wherein the diameter of the inner circumference instructs a depth (d) of planting a seed in soil in drought.

In some embodiments, the instant invention is drawn to a bangle for planting crops, comprising: a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), wherein the radius of the outer circumference instructs a depth (d) of planting seeds.

In some embodiments, the instant invention is drawn to a bangle for planting crops, comprising: a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), wherein the inner diameter is between 4.5 and 7.5 cm.

In some embodiments, the instant invention is drawn to a bangle for planting crops, comprising: a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), wherein outer radius is between 2.5 and 7.5 cm.

In some embodiments, the instant invention is drawn to a bangle for planting crops, comprising: a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), wherein said bangle is utilized to plant soy, wheat, rice, lettuce, or tomatoes.

In some embodiments, the instant invention is drawn toward a method for planting using a bangle comprising a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), comprising utilizing the markings to determine where to add water and fertilizer, and using a distance between the outer circumference and the center of the circular band as a spacing between seeds in a row called a intrarow planting parameter (o).

In some embodiments, the instant invention is drawn toward a method for planting using a bangle comprising a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), comprising utilizing the radius of the outer circumference to plant a seed a depth (d) in soil.

In some embodiments, the instant invention is drawn toward a method for planting using a bangle comprising a post, used to fasten jewelry to a body part; markings selected from the group consisting of ink, fabric, and dye; and a support material called a circular band, which has a thickness, wherein the circular band has an outer circumference and an inner circumference, and wherein a distance between the center of the circle and the outer circumference defines a spacing between seeds in a row called a intrarow planting parameter (o), comprising utilizing the diameter of the inner circumference to plant a seed a depth (d) in soil in drought conditions.

In some embodiments, the instant invention is drawn to a lariat necklace for planting crops, comprising: a post, used to fasten jewelry to a body part; markings adorning the jewelry at defined distances that specify how to plant crops; and a support material for holding the markings.

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a seed should be planted, and wherein a distance between the post and a first marking called the water fertilizer parameter (wf) defines a radius (r) with a circumference (C), and wherein the circumference defines where to add water and fertilizer to the soil.

In some embodiments, the instant invention is drawn to a lariat necklace for planting crops, comprising: a post, used to fasten the seed jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a seed should be planted, and wherein a distance between the post and a first marking called the water fertilizer parameter (wf) defines a radius (r) with a circumference (C), wherein the circumference defines where to add water and fertilizer to the soil, and wherein a distance between the first and last marking defines the distance between rows of seeds called an interrow planting parameter (e).

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a seed should be planted, and wherein a distance between the post and a first marking called the water fertilizer parameter (wf) defines a radius (r) with a circumference (C), wherein the circumference defines where to add water and fertilizer to the soil, and wherein the markings have different sizes, and wherein a distance between the two largest markings defines the distance between rows of seeds called a interrow planting parameter (e).

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a seed should be planted, and wherein a distance between the post and a first marking called the water fertilizer parameter (wf) defines a radius (r) with a circumference (C), wherein the circumference defines where to add water and fertilizer to the soil, and wherein the water fertilizer parameter (wf) is between 1 and 15 cm.

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a seed should be planted, and wherein a distance between the post and a first marking called the water fertilizer parameter (wf) defines a radius (r) with a circumference (C), wherein the circumference defines where to add water and fertilizer to the soil, and wherein the depth of planting (d) is between 1 and 10 cm.

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a seed should be planted, and wherein a distance between the post and a first marking called the water fertilizer parameter (wf) defines a radius (r) with a circumference (C), wherein the circumference defines where to add water and fertilizer to the soil, and wherein said necklace is utilized to plant corn, soy beans, rice, wheat, and potatoes.

In some embodiments, the instant invention is drawn to a method for planting using a lariat necklace comprising: a post, used to fasten jewelry to a body part; markings selected from the group consisting of jewels, seashells, and beads; and a support material called a chain, which has two free ends when unclasped, comprising: utilizing a shortest distance between adjacent markings to determine a spacing between adjacent seeds called an intrarow planting parameter (o), and using a distance between the marking furthest from the post and the end of the chain to determine the depth (d) of planting a seed, and using a distance between the post and a first marking as a radius (r) with a circumference (C), and wherein the circumference defines where to add water and fertilizer to the soil.

In some embodiments, the instant invention is drawn to a method for planting using a lariat necklace comprising: a post, used to fasten jewelry to a body part; markings selected from the group consisting of jewels, seashells, and beads; and a support material called a chain, which has two free ends when unclasped, comprising: utilizing a shortest distance between adjacent markings to determine a spacing between adjacent seeds called an intrarow planting parameter (o), and using a distance between the marking furthest from the post and the end of the chain to determine the depth (d) of planting a seed, and using a distance between the post and a first marking as a radius (r) with a circumference (C), and wherein the circumference defines where to add water and fertilizer to the soil, and wherein the markings have different sizes, and wherein a distance between the two largest markings defines the distance between rows of seeds called a interrow planting parameter (e).

In some embodiments, the instant invention is drawn to a method for planting using a lariat necklace comprising: a post, used to fasten jewelry to a body part; markings selected from the group consisting of jewels, seashells, and beads; and a support material called a chain, which has two free ends when unclasped, comprising: utilizing a shortest distance between adjacent markings to determine a spacing between adjacent seeds called an intrarow planting parameter (o), and using a distance between the marking furthest from the post and the end of the chain to determine the depth (d) of planting a seed, and using a distance between the post and a first marking as a radius (r) with a circumference (C), and wherein the circumference defines where to add water and fertilizer to the soil, and wherein the markings have different sizes, and wherein a distance between the first and last marking defines the distance between rows of seeds called a interrow planting parameter (e).

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a slip should be planted.

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a slip should be planted, wherein said necklace is used to plant sweet potatoes.

In some embodiments, the instant invention is drawn to a lariat necklace for planting crops, comprising: a post, used to fasten jewelry to a body part; markings selected from the group consisting of jewels, seashells, and beads; and a support material called a chain, which has two free ends when unclasped, wherein a shortest distance separating adjacent markings on the chain is the intrarow planting parameter (o), and wherein when the lariat necklace is unclasped, a distance between the marking furthest from the post and the end of the chain defines the depth (d) at which a slip should be planted, wherein said depth of planting (d) is between 8 and 14 cm.

In embodiments, the article of manufacture taught herein (e.g. jewelry, including: necklaces, bracelets, earrings, etc.) may be utilized in methods of planting.

DETAILED DESCRIPTION OF THE DISCLOSURE

Figure 1:
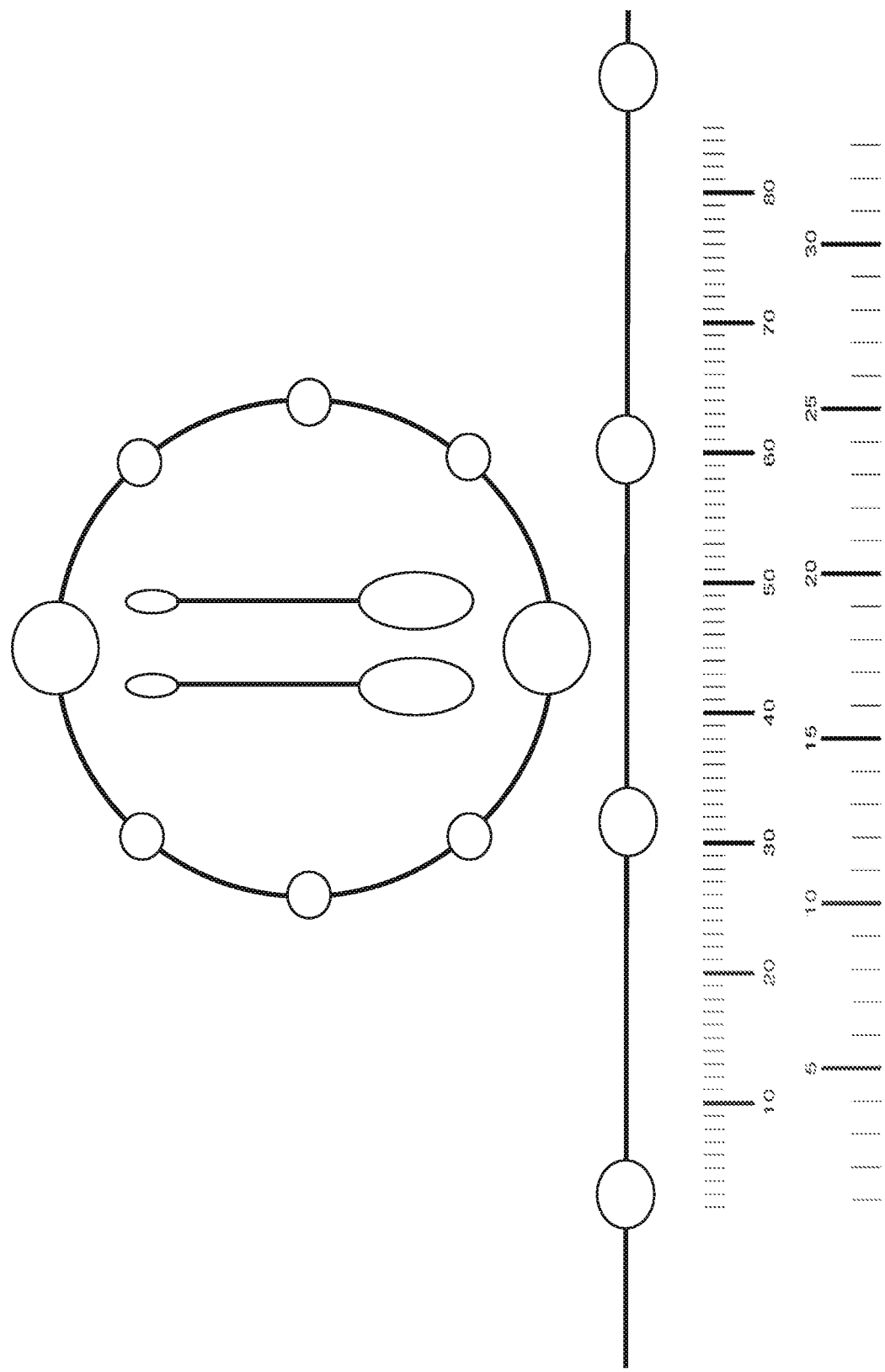
FIG. 1 depicts an example embodiment of the seed jewelry platform.
Figure 2:
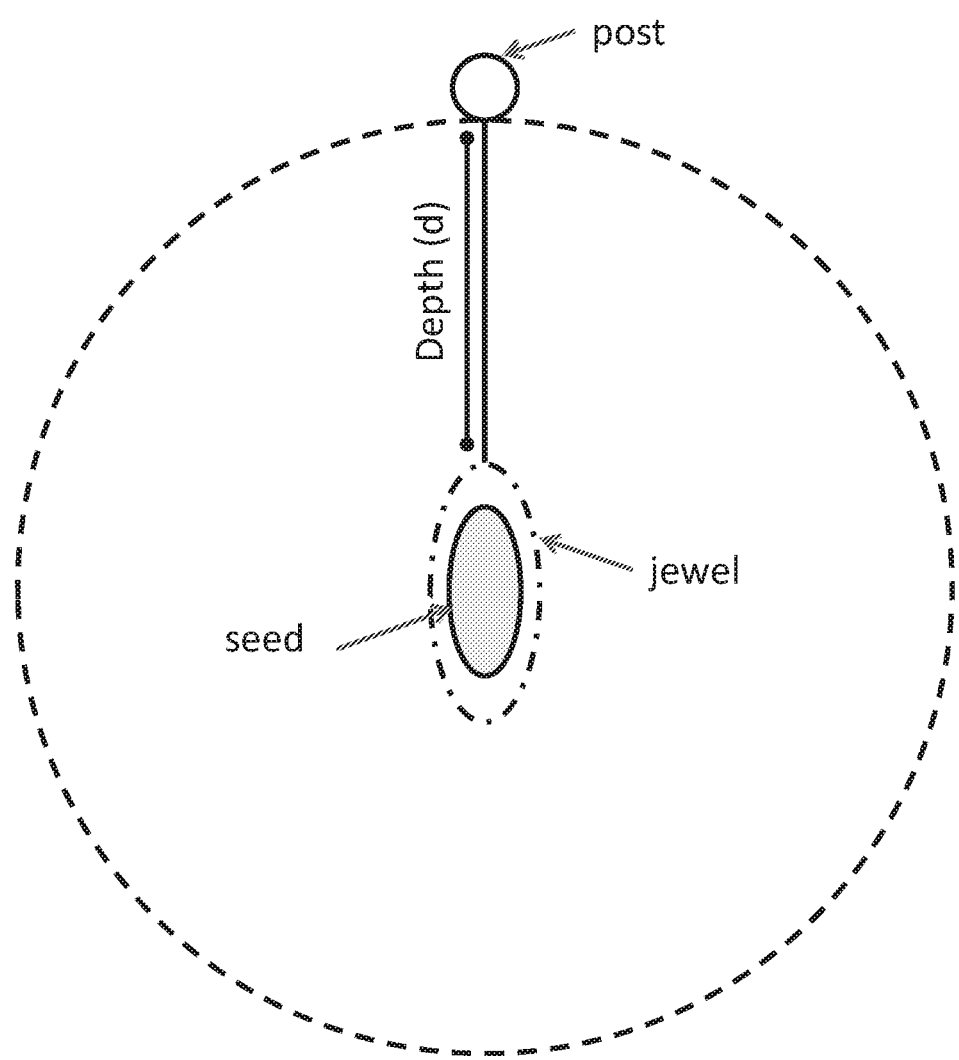
FIG. 2 depicts a schematic of earrings used for planting crops.
Figure 3:
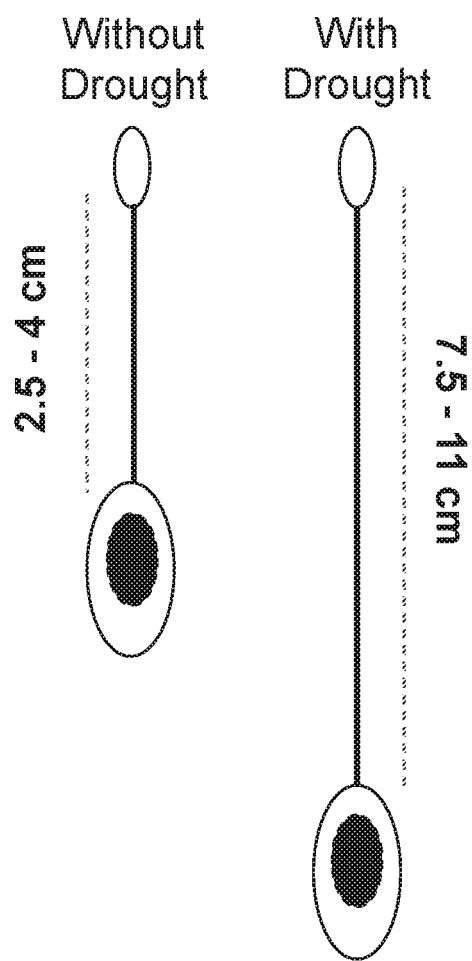
FIG. 3 depicts a schematic of an earring used to plant crops during standard conditions and an earring used to plant crops during drought conditions.

While various embodiments of the disclosure have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments of the disclosure described herein may be employed.

As used herein, the term "about" is used synonymously with the term "approximately." Illustratively, the use of the term "about" with regard to an amount indicates that values slightly outside the cited values, e.g., plus or minus 0.1% to 10%.

As used herein, the term "seed jewelry" refers to jewelry that is used to plant seeds. That is, the disclosure provides for an article of manufacture, which can be utilized in various agricultural practices and/or methods of growing crops. The article of manufacture can be combined into a kit that contains, for example: instructions and/or plant propagating material (e.g. seeds), such that the end user is able to implement the article of manufacture into a process for growing plants. The article of manufacture can be associated with digital information, such as a website that is hosted on a remoter server. The website can contain information/instructions on how to utilize the article of manufacture in a particular agricultural context, e.g. how to plant a particular plant species in a particular environment.

Jewelry Production Process:

In some embodiments, this disclosure uses jewelry to plant seeds (e.g. seed jewelry), including but not limited to, crowns, coronets, corollas, diadems, circlets, kokoshniks, makutas, pschents, khepreschs, tiaras, earrings, fascinators, watches, hairpins, hatpins, sarpechs, aigrettes, bolo ties, carcanets, chokers, necklaces, pendants, torcs, armlets, bangles, lariat necklaces, bracelets, friendship bracelets, Gospel bracelets, cuff links, rings, championship rings, class rings, engagement rings, promise rings, pre-engagement rings, wedding rings, belly chains, body piercing jewelry, breastplates, brooches, chatelaines, amulets, thumb rings, and prayer jewelry. In some embodiments, the seed jewelry is PlantingSeed™ jewelry.

In the instant disclosure, jewelry comprises a post, markings, and a support material. The post comprises a closure, a fastener, a toggle, a clasp, a hook clasp, a lobster clasp, a push button clasp, a barrel clasp, a spring ring clasp, a buckle clasp, a concealed clasp, a ladder, a swivel clasp, a magnetic clasp, and a toggle clasp. The jewelry post is the mechanism that allows jewelry to be easily put on the body and taken off the body without causing damage.

In the instant disclosure, markings adorn the jewelry at defined distances that specify how to plant crops. In some embodiments, markings comprise gemstones, jewels, beads, shells, coins, dye, ink, fabric, yarn, colored yarn, coins, pendants, and/or charms.

Markings are made from materials comprising gemstones, glass, dichroic glass, pearls, sterling silver, metals, seeds, bone, wood, ceramic, resin, and crystal. One example of a marking is a bead. Example types of beads comprise Egyptian beads, Tibetan beads, African trade beads, cabochons, cloisonné beads, organic beads, Heishi beads, stopper beads, horn beads, magnetic beads, Czech glass beads, fire polished beads, gold filled beads, Japanese seed beads, Czech seed beads, Japanese cylinder beads, Charlottes, hex-cut beads, triangle beads, cube beads, drop beads, color-changing beads, mood ring beads, thermos-sensitive liquid crystal beads, and/or bugle beads.

In some embodiments, markings can be uniform in color. In some embodiments, markings can be any color found on the electromagnetic spectrum. In some embodiments, markings can be a color, specified by a color dictionary recognized in the United States. In some embodiments, markings can be colors, specified by the color hex code, which is a way of specifying colors using hexadecimal values. In some embodiments, markings can be any color, specified by the Cyan, Magenta, Yellow, and Key (CMYK) color model. In some embodiments of the disclosure, markings can be any color, specified by the Red, Green, Blue (RGB) color model.

In some embodiments, the markings are different shapes. Non-limiting examples of shapes include barrels, spheres, ovals, rondelles, drums, heishi, diamond, triangle, octagon, hexagon, pentagon, sqare, dogbone, emerald, or tubes.

In some embodiments of this disclosure, the colors of the markings represent different pHs. In some embodiments of this disclosure, the pH is about 1, the pH is about 2, the pH is about 3, the pH is about 4, the pH is about 5, the pH is about 6, the pH is about 7, the pH is about 8, the pH is about 9, the pH is about 10, the pH is about 11, the pH is about 12, the pH is about 13, or the pH is about 14. In some embodiments of the disclosure, the colors of the markings represent different minerals needed for growing crops, including nitrogen, phosphorus, and potassium.

In some embodiments, markings of certain color instruct planting a seed and markings of a different color instruct not planting a seed.

In some embodiments of the disclosure, a key can be utilized to compare the color or shape of the markings to physical characteristics on a plant to determine mineral deficiencies in plants. For instance, potassium deficiency manifests in plants as yellow circles in green leaves. Sweet potato feathery mottle virus (SPFMV) virus manifests as chloritic circles in new purple leaves. For example, when soy bean leaves have brown spots or holes within, a planter should suspect blight. When soy beans are brown or yellow, soy beans have *Septoria*. When soy beans are brown or black, soy beans will die suddenly. In some embodiments of the disclosure, a key can be utilized to compare the color of the markings to the color of a pH strip, which has been placed in soil.

Examples of gemstones comprise diamond, amber, emerald, jade, jasper, ruby, sapphire, turquoise, pearls, and/or quartz.

In the instant disclosure, a support material is a material for holding the markings. Examples of support materials comprise bands, dangles, chains, wires, and/or rods, which are elongated or shaped into circles and/or ovals. Support materials are made of platinum, bronze, copper, nickel, brass, rose gold, silver, gold, stainless steel, chrome, silk, rhodium, ribbon, felt, leather, cotton, linen, hemp, twine, bone, ivory, natural clay, polymer clay, glass, enamel, wood, wire, yarn, and/or fabric. Fabrics are made from yarn or thread.

In some embodiments, the methods of this disclosure relate to jewelry making, comprising wire-wrapping, resin-casting, metalsmithing, firing clay, stringing, knotting, crimping, beading, metal fabrication, crocheting, and/or weaving.

In some embodiments, the methods in this disclosure relate to metal finishing, or any operation or activity that alters the surface of a metal piece to achieve a certain property or look. Metal finishing comprises cleaning, soldering, plating and texturing.

In some embodiments, this disclosure uses cleaning methods at various stages of jewelry making to remove sand, scale, and/or excess metal from metal castings. Cleaning methods include pickling, sandblasting, steam cleaning, soap water cleaning, supercritical fluid cleaning, and ultrasonic cleaning. Pickling is a process in which chemicals are used to remove oxide and carbon deposits from metal and fire stain and oxidation caused by soldering. Sandblasting is the process of cleaning smoothing or etching a hard surface by forcing fine bits of solid material, most commonly sand, across that surface at high speeds. Steam cleaning is the cleaning of metal casting through steam, whereas soap water cleaning utilizes mild soap detergent and water to clean metal castings. Supercritical fluid cleaning is the cleaning of metal casting with small openings or complex designs. Ultrasonic cleaning is the cleaning of a metal piece using ultrasonic cleaners.

In some embodiments, this disclosure uses soldering to join metal pieces together. The soldering technique involves two or more metal pieces that are joined by applying a molten metal or metal alloy that has a lower melting point than the two metals being joined.

In some embodiments, this disclosure uses plating, which is a technique used to cover or coat a thin layer of metal to another metal surface. Examples of plating techniques include electroplating, electroless plating, chemical plating, electrochemical plating, mechanical plating, spray plating, hot dip plating, gold dip plating, silver plating, rhodium plating, chrome plating, zinc plating, and/or tin plating.

In some embodiments, this disclosure utilizes a polishing technique for rubbing a metal piece to make it smooth and shiny and reduce the appearance of flaws. Tumbling, bombing, stripping, and buffing are all examples of different metal polishing techniques. Tumbling is the process used to get shine and brightness in a metal piece. Bombing and stripping are used to brighten metal pieces. Buffing refers to the use of grease to produce a smooth polished surface.

In some embodiments, this disclosure involves texturing techniques to give metals finishes comprising a Florentine finish, a Hammered finish, a high polish finish, a satin finish, and/or a matte or brushed finish.

In some embodiments, this disclosure utilizes stone finishing, which refers to operations or activities that alter the characteristics of a gemstone, such as stone cutting and polishing, sawing, drilling, tumbling, grinding, sanding, lapping, and/or polishing.

In some embodiments, this disclosure utilizes stone treatments and enhancements to enhance the appearance and durability of stones, such as heating, irradiation, diffusion, laser drilling, oiling, dying, and/or bleaching.

Jewelry Design for Planting Seeds and Slips

In some embodiments of this disclosure, the intrinsic properties of the support material are utilized for planting seeds. For example, when the jewelry is an earring, the support material can be a dangle, which connects the post to the marking. The length of the dangle instructs a depth (d) of planting a seed. The length of the dangle may be elongated in drought conditions. The length of the dangle is between 1 and 15 cm.

In some embodiments, the length of the dangle serves as the radius (r) of a circle. The circumference (c) of a circle with a radius (r) is $c=2\pi r$, where $\pi$ is 3.14159265359. The area (A) of a circle with a radius (r) is $A=\pi r^2$, where $\pi$ is 3.14159265359. The circumference of the circle represents the location on which water and/or fertilizer should be added to the soil.

In some embodiments, when the jewelry is a bracelet, and the support material utilized is a circular band, the geometric parameters of a circle are applied to planting seeds. The circumference (c) of a circle with a radius (r) is $c=2\pi r$, where $\pi$ is 3.14159265359. The area (A) of a circle with a radius (r) is $A=\pi r^2$, where $\pi$ is 3.14159265359. In some embodiments, the circular band contains markings protruding from the inside and outside of the circular band. An inner circumference is formed by drawing a circle connecting the markings protruding from the inside of the circular band, and an outer circumference is formed by drawing a circle connecting the markings protruding from the outside of the circular band. The distance between the center of the circle and the outer circumference defines a spacing between seeds in a row called an intrarow planting parameter (o). In some embodiments, the markings on the bracelet are utilized to determine where to add water and fertilizer.

In some embodiments of this disclosure, the jewelry is a bangle, and the support material is a circular band with a thickness, and therefore there exists an inner and outer circumference.

In some embodiments of the disclosure, when the support material is a circular band, the radius of the outer circumference of the circular band defines the depth (d) at which to plant seeds; during drought conditions, the diameter of the inner circumference of the circular band defines the depth (d) at which to plant seeds. In some embodiments, the outer radius is between 2.5 and 7.5 cm. In some embodiments, the inner diameter is between 4.5 and 7.5 cm.

In some embodiments of this disclosure, spacings between markings reflect the distance for watering and adding fertilizer, or the water fertilizer parameter (wf).

In some embodiments of this disclosure, the support material is a chain that is unclasped. In some embodiments, the aforementioned chain has two free ends. A free end is extra chain adjacent to the terminal jewels. One free end of the aforementioned chain which is furthest from the post defines the depth (d) of planting a seed. The other free end of the aforementioned chain which is closest to the post serves as the radius (r) of a circle, which is utilized for determining the water/fertilizer parameter (wf). The circumference (C) of a circle with a radius (r) is $c=2\pi r$, where $\pi$ is 3.14159265359. In some embodiments of this disclosure, water and fertilizer is added to the circumference of the circle. In some embodiments of this disclosure, the aforementioned chain is a lariat necklace. In some embodiments of this disclosure, the aforementioned chain is utilized to plant corn, potato, rice, wheat, beets, broccoli, cabbage, carrots, celery, chufa, cotton, cowpea, fava beans, green beans, kenaf, leeks, lettuce, lupine Blue, yellow, maize, onions, parsnips, peanut runners, peas, pigion pea, sorghum, sorghum grain, sorghum sillage, sorghum x sudangrass, soybean, sunflower, sweet potato, tomato, velvetbean, watermelon, and wheat.

In some embodiments of this disclosure, when the support material is a chain, spacings between markings define the intrarow planting parameter (o). In some embodiments, spacings between adjacent markings define the intrarow planting parameter (o).

In some embodiments of this disclosure, when a support material is a chain, a distance between markings defines the interrow planting parameter (e). In some embodiments of this disclosure, when the support material is a chain, the markings have different sizes, and the distance between the two largest markings defines the interrow planting parameter (e). In some embodiments of this disclosure, the distance between the first and last marking defines the interrow planting parameter (e). When the support material is rotated 90° from the previous row, the next row of seeds can be planted.

In some embodiments, the support material is a chain that is unclasped. In some embodiments, the support material is a chain, and the chain has a loop at one free end. In some embodiment, the support material is a chain, and the chain has a loop at one end. In some embodiments, the loop is placed around a material that protrudes from the ground. Non-limiting examples of materials include picks, stakes, nails, and sticks.

Figure 14:
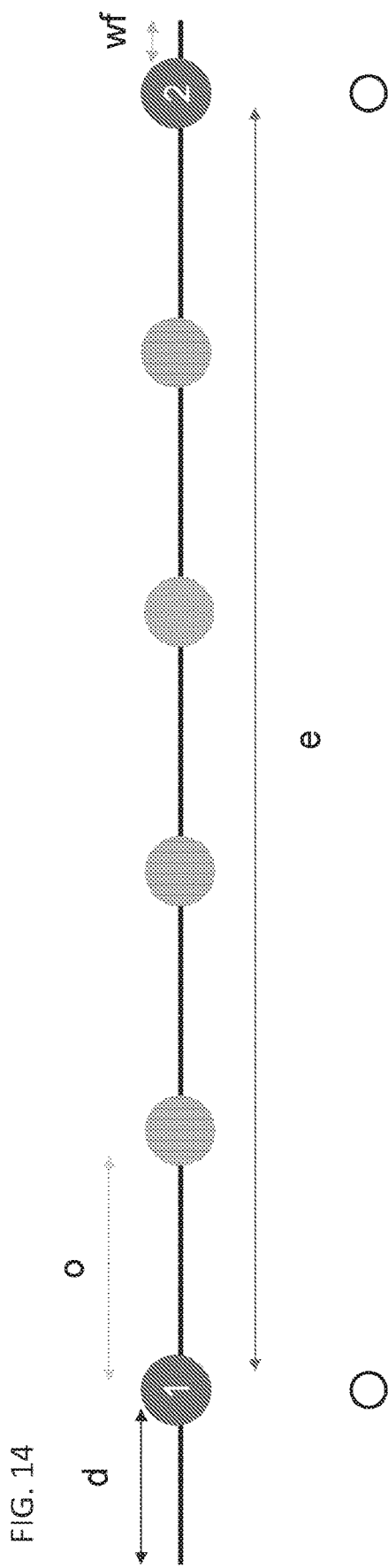
FIG. 14 depicts a schematic of a lariat necklace with two rows.
Figure 15:
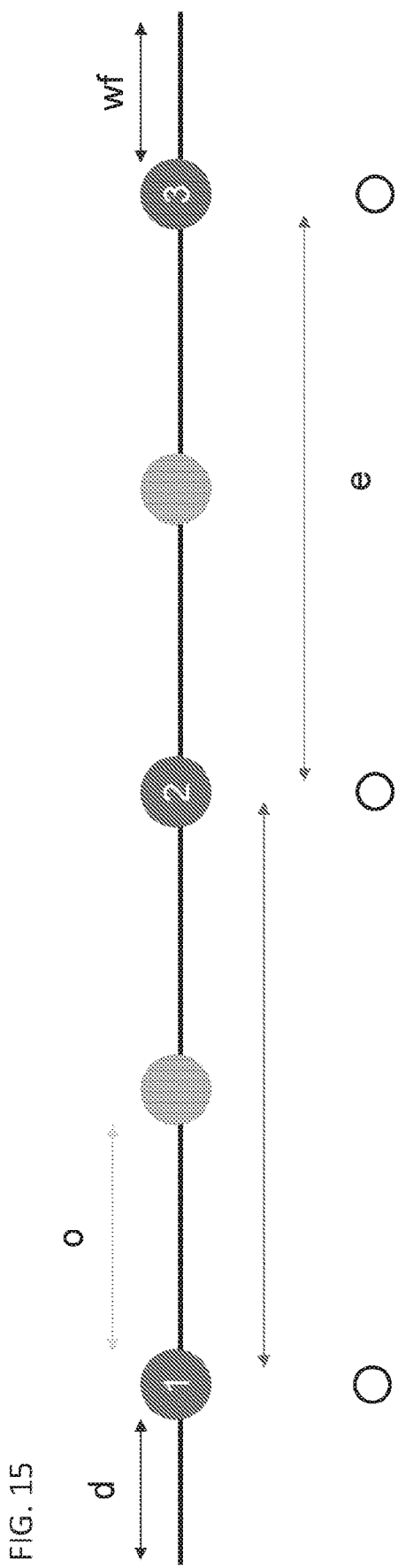
FIG. 15 depicts a schematic of a lariat necklace with three rows.

In some embodiments, the chain is placed flat on the ground. A material that protrudes from the ground is used to denote the position of each row (row positions=1, 2, and 3 in FIG. 15 and row positions=1 and 2 in FIG. 14). The material is placed on the white circle at a position which is right below the length of the chain as in FIG. 14 and FIG. 15. The chain is then rotated 90° and the loop is placed around the material that denotes each row. A seed is planted at every marking.

Figure 16:
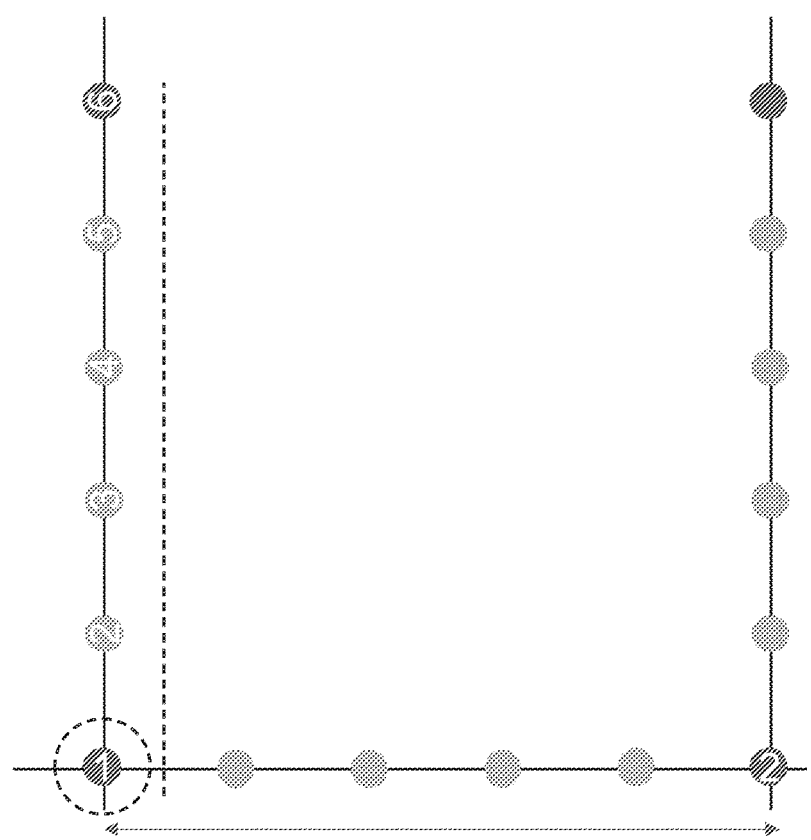
FIG. 16 depicts a schematic of a lariat necklace used to plant two rows of seeds for maximizing harvest.
Figure 17:
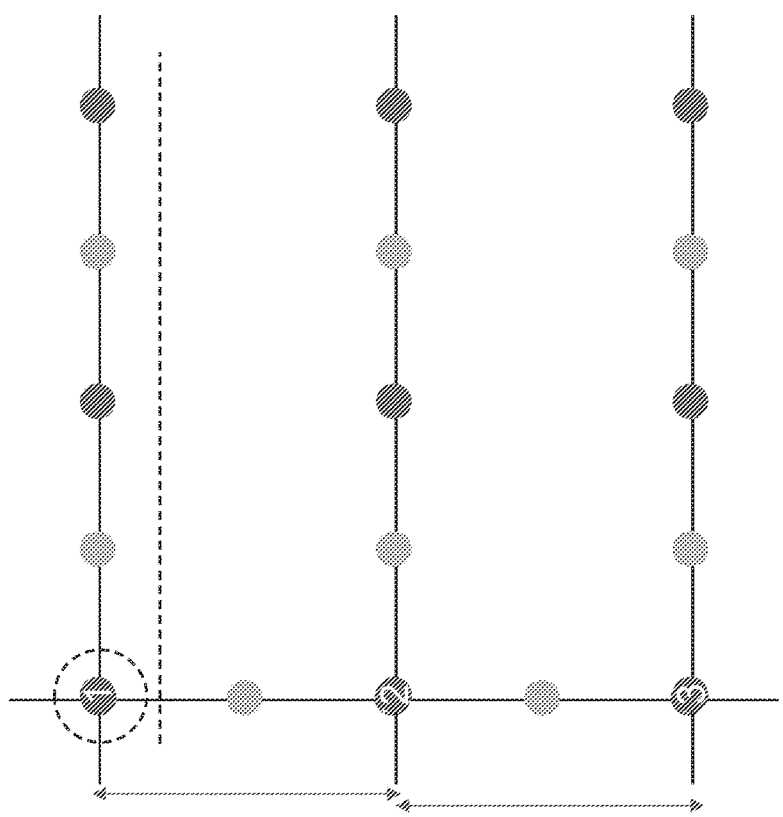
FIG. 17 depicts a schematic of a lariat necklace used to plant three rows of seeds for maximizing harvest.

In some embodiments, this process may be repeated to plant more rows by rotating the chain to its original position and translating the necklace such that bead 1 is placed on row 3. Additional rows would be planted at markings 2 and 3. This process is illustrated in FIG. 16 and FIG. 17.

In some embodiments, the length of a row may be extended by marking rows with a material that protrudes from the ground, rotating the chain 90°, planting seeds at every bead position, translating the necklace such that bead 1 is placed on the seed planted at row 3, and planting seeds at the other markings of the necklace. This process is illustrated in FIG. 16 and FIG. 17.

Figure 20:
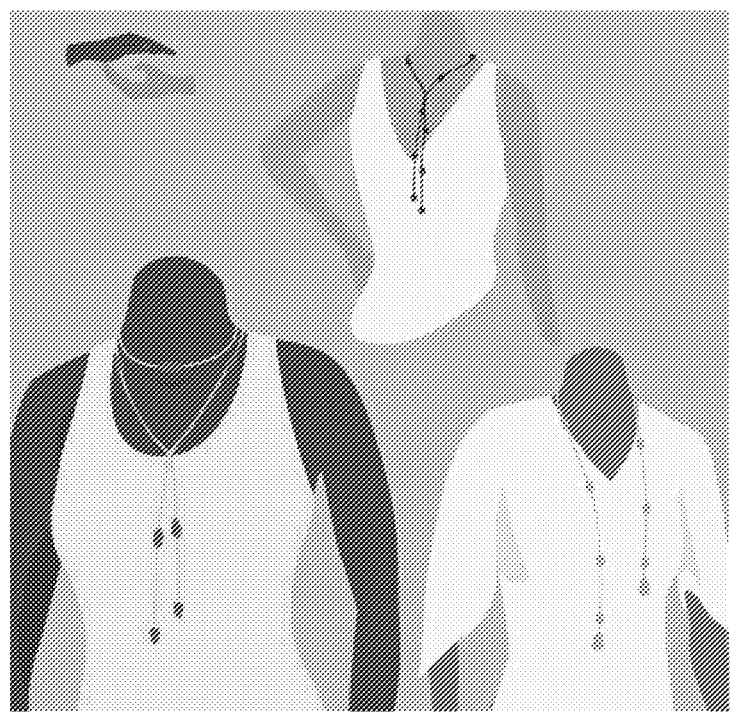
FIG. 20 shows the variety of ways the lariat necklace can be worn. The lariat is a wearable dialogue about growing food as well as new technology used to maximize crop yield.
Figure 21:
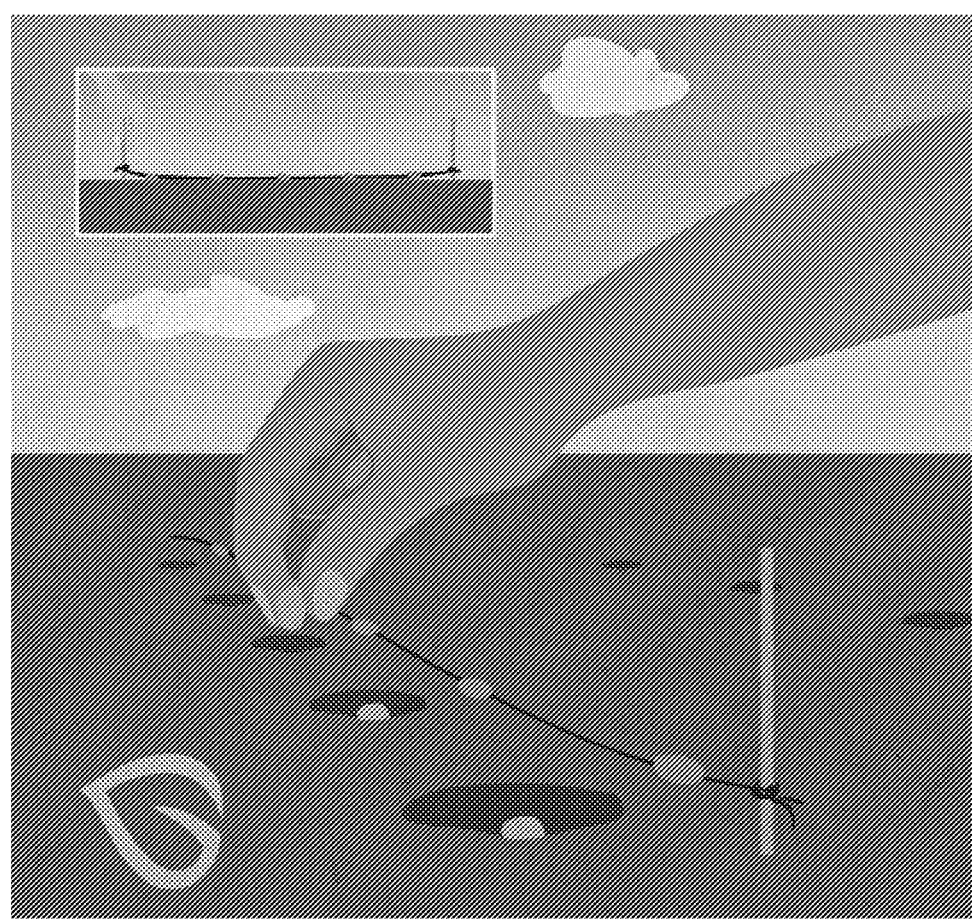
FIG. 21 is a cartoon representation of how a lariat can be utilized to plant seeds. When a farmer places a lariat necklace on the ground, the lariat serves as a visual guide for planting seeds. Each bead represents a seed, and the distances between the beads dictate growing parameters, like intrarow spacing, interrow spacing, depth, and water fertilizer parameter. The distance from the terminal bead to the tassel shows the depth at which seeds should be planted.
Figure 22:
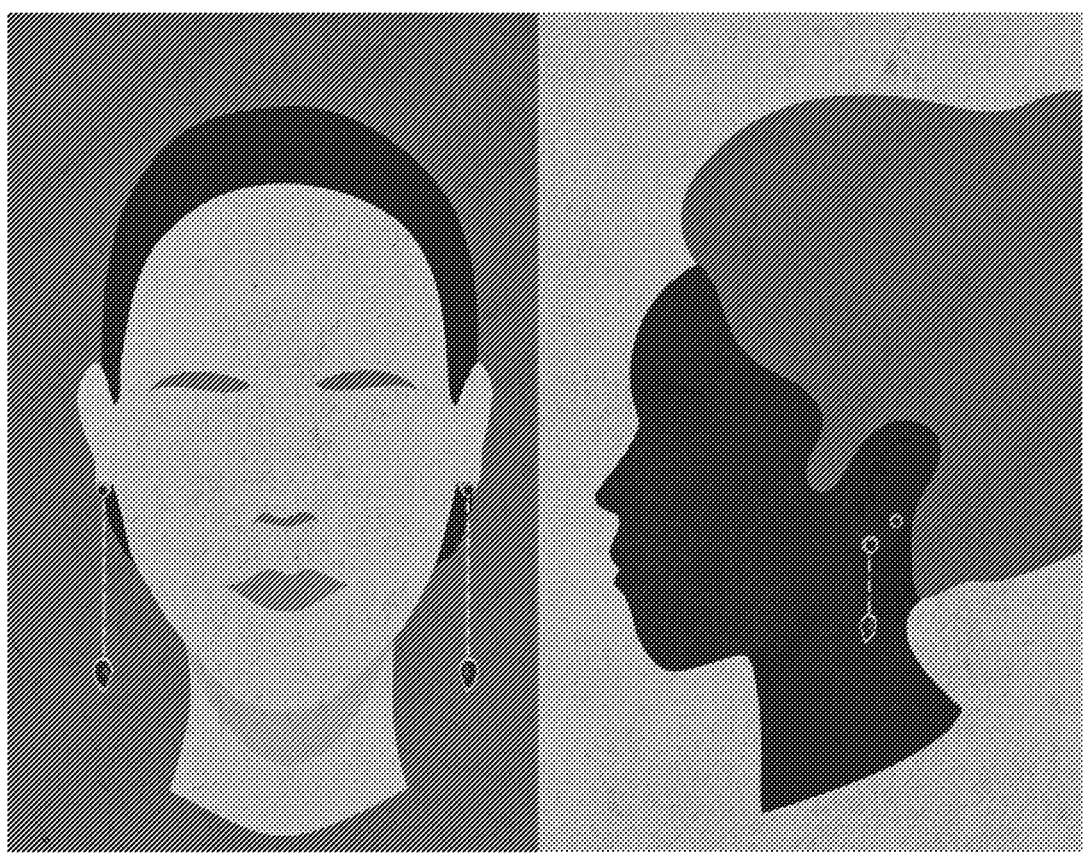
FIG. 22 shows a schematic of how earrings can be worn, showing the difference between earrings used in drought and non-drought conditions. In dry conditions, seeds need to be planted deeper than usual so that roots can get to water. The earrings highlight the depth that can make the difference between families being fed or going hungry. The earrings have interchangeable studs that can be worn independently or with others.
Figure 23:
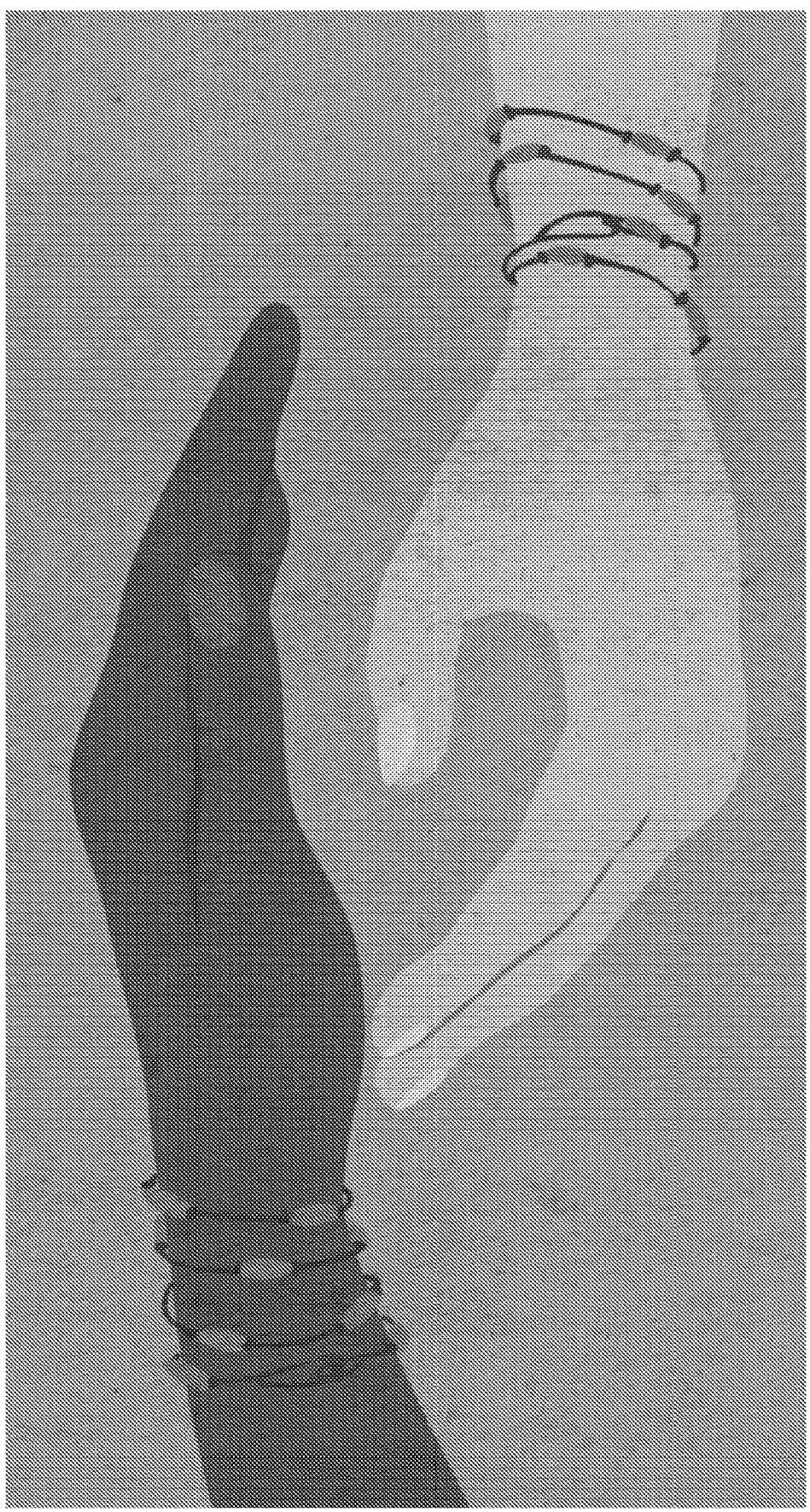
FIG. 23 depicts a schematic of a lariat necklace worn as a bracelet. When seeds are planted too close together, they compete for sunlight and room to grow. With proper spacing, plants thrive. With every purchase, Grow More Foundation® donates a durable lariat to a farmer to grow more.

In some embodiments, the lariat necklace can be worn in a variety of ways, as shown in FIG. 20. In some embodiments, the lariat necklace can be wrapped around a person's wrist and worn as a bracelet as shown in FIG. 23. FIG. 21 shows how the lariat necklace can be utilized to plant seeds.

In some embodiments of this disclosure, a necklace can be utilized for planting slips. For example, a necklace utilizing an unclasped chain as a support material has two free ends. One free end of the aforementioned chain which is furthest from the post defines the depth (d) of planting the slip. There is no water fertilizer parameter (wf) in a necklace utilized to plant slips. In some embodiments of the disclosure, the aforementioned necklace is used to plant sweet potatoes.

In some embodiments of this disclosure, a lariat necklace can be utilized for planting slips. For example, a necklace utilizing an unclasped chain as a support material has two free ends. One free end of the aforementioned chain which is furthest from the post defines the depth (d) of planting the slip. There is no water fertilizer parameter (wf) in a necklace utilized to plant slips. In some embodiments of the disclosure, the aforementioned lariat necklace is used to plant sweet potatoes.

In some embodiments, seeds are planted at every marking within an item of seed jewelry. In some embodiments, seeds are planted at every other marking, every third marking, every fourth marking, every fifth marking, or every sixth marking in a lariat. In some embodiments, seeds are planted at one marking, 2 markings, 3 markings, 4 markings, 5 markings, 6 markings, 7 markings, 8 markings, 9 markings, 10 markings, 11 markings, 12 markings, 13 markings, 14 markings, 15 markings, 16 markings, 17 markings, 18 markings, 19 markings, 20 markings, 21 markings, 22 markings, 23 markings, 24 markings, 25 markings, 26 markings, 27 markings, 28 markings, 29 markings, 30 markings, 31 markings, 32, 33 markings, 34 markings, 35 markings, 36 markings, 37 markings, 38 markings, 39 markings, 40 markings, 41 markings, 42 markings, 43 markings, 44 markings, 45 markings, 46 markings, 47 markings, 48 markings, 49 markings, 50 markings, 51 markings, 52 markings, 53 markings, 54 markings, 55 markings, 56 markings, 57 markings, 58 markings, 59 markings, 60 markings, 61 markings, 62 markings, 63 markings, 64 markings, 65 markings, 66 markings, 67 markings, 68 markings, 69 markings, 70 markings, 71 markings, 72 markings, 73 markings, 74 markings, 75 markings, 76 markings, 77 markings, 78 markings, 79 markings, 80 markings, 81 markings, 82 markings, 83 markings, 84 markings, 85 markings, 86 markings, 87 markings, 88 markings, 89 markings, 90 markings, 91 markings, 92 markings, 93 markings, 94 markings, 95 markings, 96 markings, 97 markings, 98 markings, 99 markings, 100 markings or more.

Diseases in Plants:

Certain plants suffer from disease conditions called "damping off" and "root rot." The symptoms of damping off include the desiccation and subsequent death of seedlings soon after germination. Root rot symptoms include chlorosis and wilt of leaves and yellow to brown lesions with diffuse margins on roots and stems. The lesions can eventually lead to girdling and subsequent root decay resulting in decreased robustness in the plant or even in death. Often plants suffering from root rot begin by showing such symptoms, which may be mistaken as symptoms of drought and starvation. Such plants may be more vulnerable than healthy plants to attack by other pathogens, which are then mistaken as the cause of the death of the plants (U.S. Pat. No. 4,877,738).

Damping off and root rot are merely two different sets of symptoms caused by infection of the plant by the same fungi and, in particular, by members of the *Phytophthora, Phythium, Aphanomyces,* and *Fusarium* genera (U.S. Pat. No. 4,877,738).

The methods described herein are suitable for decreasing root rot and damping off.

Commercial rice plantings are vulnerable to attack by several diseases. The more significant diseases economically include sheath blight, which is caused by the fungus *Rhizoctonia solani*, and bacterial panicle blight, which is caused by the bacteria *Burkholderia glumae*. Sheath blight has been reported to be second in economic significance only to rice blast among fungal diseases of rice worldwide. Sheath blight has a major impact on rice yield in the U.S. Gulf of Mexico rice production areas.

The initial symptoms of sheath blight include lesions on sheaths of the lower leaves. Over time, the lesions expand and can spread to upper plant parts. Infected plants can produce poorly filled grain, particularly in the lower portion of the panicle. The fungal pathogen can survive long periods in the soil to infect crops in subsequent years. Heavy nitrogen applications increases the susceptibility of plants to sheath blight.

The bacteria *Burkholderia glumae* can produce symptoms that include seedling blight, sheath rot, and panicle blight. The disease is a particular problem under conditions of unusually hot weather and warm nights (US 2004/0168232 A1).

Crops that can be Grown with Seed Jewelry:

The methods described herein are suitable for any of a variety of plants, such as plants in the genera *Hordeum, Oryza, Zea*, and *Triticeae*. Other non-limiting examples of suitable plants include mosses, lichens, and algae. In some cases, the plants have economic, social and/or environmental value, such as food crops, fiber crops, oil crops, plants in the forestry or pulp and paper industries, feedstock for biofuel production and/or ornamental plants. In some examples, plants may be used to produce economically valuable products such as a grain, a flour, a starch, a syrup, a meal, an oil, a film, a packaging, a nutraceutical product, a pulp, an animal feed, a fish fodder, a bulk material for industrial chemicals, a cereal product, a processed human-food product, a sugar, an alcohol, and/or a protein. Non-limiting examples of crop plants include maize, rice, wheat, barley, sorghum, millet, oats, rye triticale, buckwheat, sweet corn, sugar cane, onions, tomatoes, strawberries, and asparagus. In some embodiments, the methods and bacteria described herein are suitable for any of a variety of transgenic plants, non-transgenic plants, and hybrid plants thereof.

In some examples, plants that may be planted using the seed jewelry disclosed herein may include plants that are important or interesting for agriculture, horticulture, biomass for the production of biofuel molecules and other chemicals, and/or forestry. Some examples of these plants may include pineapple, banana, coconut, lily, grasspeas and grass; and dicotyledonous plants, such as, for example, peas, alfalfa, tomatillo, melon, chickpea, chicory, clover, kale, lentil, soybean, tobacco, potato, sweet potato, radish, cabbage, rape, apple trees, grape, cotton, sunflower, thale cress, canola, citrus (including orange, mandarin, kumquat, lemon, lime, grapefruit, tangerine, tangelo, citron, and pomelo), pepper, bean, lettuce, *Panicum virgatum* (switch), *Sorghum bicolor* (sorghum, sudan), *Miscanthus giganteus* (*miscanthus*), *Saccharum* sp. (energycane), *Populus balsamifera* (poplar), *Zea mays* (corn), *Glycine max* (soybean), *Brassica napus* (canola), *Triticum aestivum* (wheat), *Gossypium hirsutum* (cotton), *Oryza sativa* (rice), *Helianthus annuus* (sunflower), *Medicago sativa* (alfalfa), *Beta vulgaris* (sugarbeet), *Pennisetum glaucum* (pearl millet), *Panicum* spp. *Sorghum* spp., *Miscanthus* spp., *Saccharum* spp., *Erianthus* spp., *Populus* spp., *Secale cereale* (rye), *Salix* spp. (willow), *Eucalyptus* spp. (*eucalyptus*), *Triticosecale* spp. (*triticum*-25 wheat X rye), Bamboo, *Carthamus tinctorius* (safflower), *Jatropha curcas* (*Jatropha*), *Ricinus communis* (castor), *Elaeis guineensis* (oil palm), *Phoenix dactylifera* (date palm), *Archontophoenix cunninghamiana* (king palm), *Syagrus romanzoffiana* (queen palm), *Linum usitatissimum* (flax), *Brassica juncea, Manihot esculenta* (cassava), *Lycopersicon esculentum* (tomato), *Lactuca saliva* (lettuce), *Musa paradisiaca* (banana), *Solanum tuberosum* (potato), *Brassica oleracea* (broccoli, cauliflower, brussel sprouts), *Camellia sinensis* (tea), *Fragaria ananassa* (strawberry), *Theobroma cacao* (cocoa), *Coffea arabica* (coffee), *Vitis vinifera* (grape), *Ananas comosus* (pineapple), *Capsicum* annum (hot & sweet pepper), *Allium cepa* (onion), *Cucumis melo* (melon), *Cucumis sativus* (cucumber), *Cucurbita maxima* (squash), *Cucurbita moschata* (squash), *Spinacea oleracea* (spinach), *Citrullus lanatus* (watermelon), *Abelmoschus esculentus* (okra), *Solanum melongena* (eggplant), *Papaver somniferum* (opium poppy), *Papaver orientale, Taxus baccata, Taxus brevifolia, Artemisia annua, Cannabis saliva, Camptotheca acuminate, Catharanthus roseus, Vinca rosea, Cinchona officinalis, Coichicum autumnale, Veratrum californica, Digitalis lanata, Digitalis purpurea, Dioscorea* 5 spp., *Andrographis paniculata, Atropa belladonna, Datura stomonium, Berberis* spp., *Cephalotaxus* spp., *Ephedra sinica, Ephedra* spp., *Erythroxylum coca, Galanthus wornorii, Scopolia* spp., *Lycopodium serratum* (*Huperzia serrata*), *Lycopodium* spp., *Rauwolfia serpentina, Rauwolfia* spp., *Sanguinaria canadensis, Hyoscyamus* spp., *Calendula officinalis, Chrysanthemum parthenium, Coleus forskohlii, Tanacetum parthenium, Parthenium argentatum* (guayule), *Hevea* spp. (rubber), *Mentha spicata* (mint), *Mentha piperita* (mint), *Bixa orellana, Alstroemeria* spp., *Rosa* spp. (rose), *Dianthus caryophyllus* (carnation), *Petunia* spp. (*petunia*), *Poinsettia pulcherrima* (*poinsettia*), *Nicotiana tabacum* (tobacco), *Lupinus albus* (lupin), *Uniola paniculata* (oats), *Hordeum vulgare* (barley), and *Lolium* spp. (rye), Beets, Broccoli, Cabbage, Carrots, Celery, Chufa, Corn, Cotton, Cowpea, Fava beans, Green beans, Kenaf, Leeks, Lettuce, Lupine Blue, yellow, Maize, Onions, Parsnips, Peanut runners, Peas, Pigion pea, Potato, Rice, Sorghum, Sorghum grain, Sorghum sillage, Sorghum x sudangrass, Soybean, Sunflower, Sweet Potato, Tomatoes, Velvetbean, Watermelon, and Wheat.

EXAMPLES

The following examples are given for the purpose of illustrating various embodiments of the disclosure and are not meant to limit the present disclosure in any fashion. Changes therein and other uses which are encompassed within the spirit of the disclosure, as defined by the scope of the claims, will be recognized by those skilled in the art.

An example overview of an embodiment of the seed jewelry platform is summarized in FIG. 1.

FIG. 1 illustrates that mathematics can be utilized to design jewelry which teaches farmers how to plant corn based on the defined placement of jewels within a necklace, bracelet, bangle, and/or earrings. Each of the pieces of jewelry is described in the examples below:

Example 1: Water Irrigation Earrings

Water irrigation earrings were generated in order to enable farmers to grow plants from seeds, including, but not limited to tomatoes, carrots, rice, soy beans, and wheat. A schematic of the water irrigation earrings is depicted in FIG. 2. The earrings consist of a post, a dangle, and a jewel. The dangle connects the post to the jewel. The geometry associated with the design of the earrings can be utilized to help farmers grow plants from seeds. Precise measurements for using the earrings to plant maize are found in Table 1 for normal environmental conditions and Table 2 for drought environmental conditions.

The length of the dangle represents the depth (d) a seed should be planted in the soil. Variations of the water irrigation earrings have been generated in which the length of the dangle is elongated to reflect the depth a seed should be planted when there is less water available, for example, in drought conditions, as depicted in FIG. 3. During non-drought conditions, the length of the dangle is 2.5-4 cm, instructing farmers to plant seeds 2.5-4 cm in the soil. This length varies with crop. During drought conditions, the length of the dangle increases to 7.5-11 cm, instructing farmers to plant seeds 7.5-11 cm in the soil to ensure that roots can access water.

The length of the dangle also represents the radius (r) of a circle, which has a circumference (c). The circumference of a circle was calculated using the equation c=2πr, where π is 3.14159265359.

The circumference ranges from 15.7 cm-25.1 cm in non-drought conditions. In non-drought conditions, the circumference of the circle represents the location on which water and/or fertilizer should be added to the soil.

Example 2. Bracelets for Planting Soy, Wheat, Rice, Lettuce, Tomatoes

Figure 4:
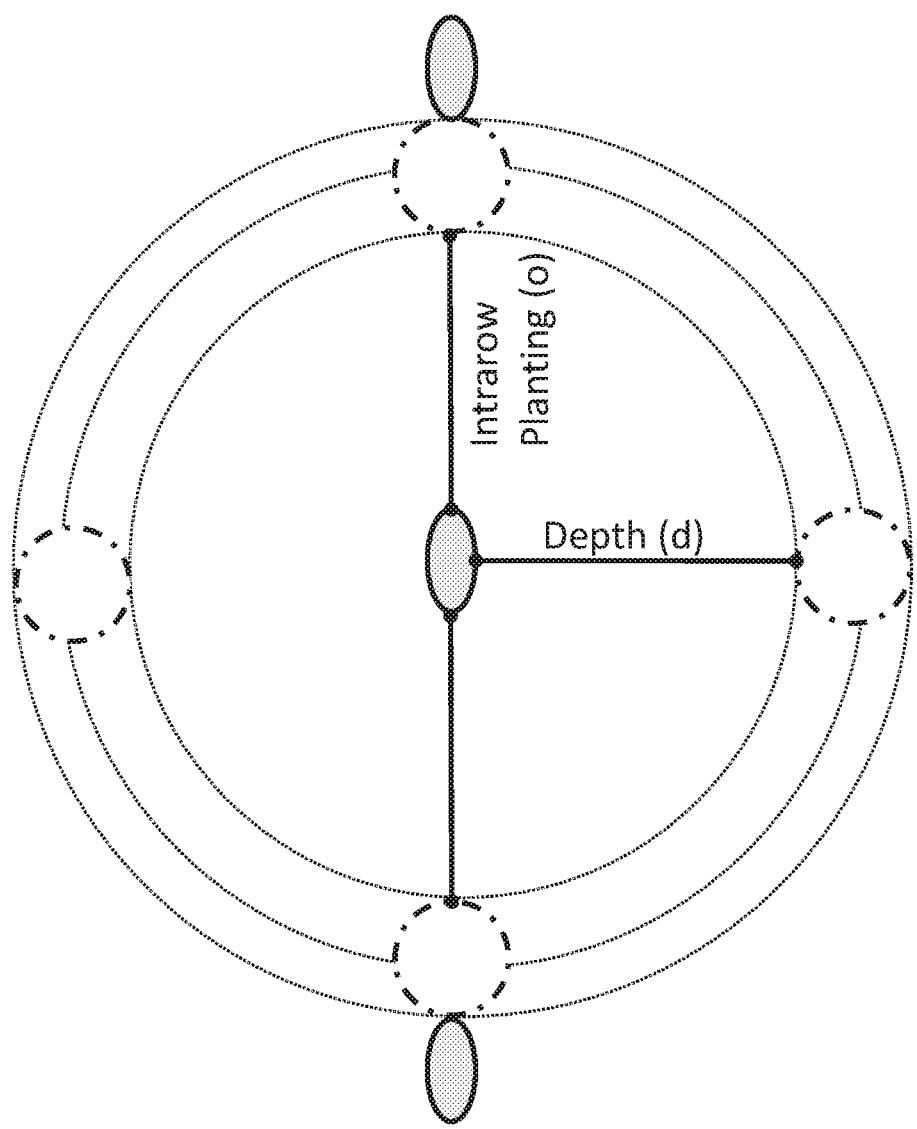
FIG. 4 depicts a schematic of bracelets used for planting crops.

Bracelets were also created to enable farmers to plant soy, wheat, rice, lettuce, and tomatoes. A schematic of the bracelets is depicted in FIG. 4. The geometry associated with the design of the bracelets can be utilized to help farmers grow plants from seeds. Precise measurements for the bracelets are found in Table 1 for normal environmental conditions and Table 2 for drought conditions.

The bracelets consist of a thin, circular solid metal band decorated with jewels. In this example, four jewels are found on the circular band at 0°, 90°, 180°, and 270°. The jewels are oriented on the band such that an inner circumference and outer circumference is generated, as shown in FIG. 4.

Seeds are placed in the center of the bracelet and proximal to the jewels at 900 and 270°. as shown in FIG. 4. The distance between the center of the bracelet and a large jewel is the intrarow planting parameter (o). The inside diameter of the bracelets is 6.5 cm. Therefore, the intrarow planting parameter (o) is 4.5 cm for soy, wheat, rice, lettuce, and tomatoes.

Bracelets can also be utilized to determine the depth (d) at which to plant seeds. The depth (d) for planting in non-drought conditions is the radius of the bracelets, which is 4.5 cm, including the beads, as shown in FIG. 4. The diameter for planting during drought conditions is the inner diameter of the bracelets, which is 6.5 cm.

Figure 5:
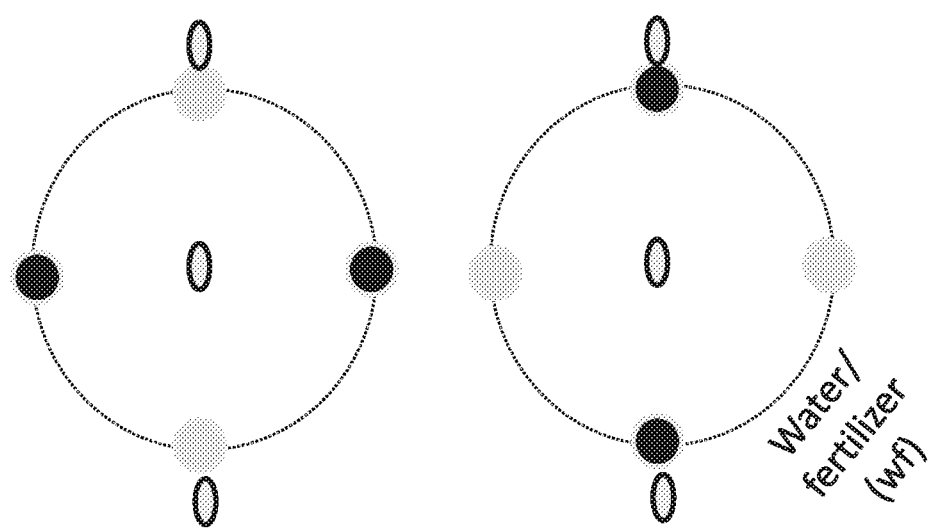
FIG. 5 shows how the spacing between markings on a bracelet shows where to add water and fertilizer to a crop.

The spacing between the beads reflects the distance for watering and adding fertilizer, or the water/fertilizer parameter (wf), as shown in FIG. 5. After three seeds are planted in the soil, as in FIG. 5, the bracelet is placed on top of the seed, such that one seed is in the middle of the bracelet, and additional seeds are proximal to the jewels at 90° and 270°. Water and fertilizer is added between the seeds at the position of the jewels.

Example 3. Bangles for Planting Soy, Wheat, Rice, Lettuce, Tomatoes

Figure 6:
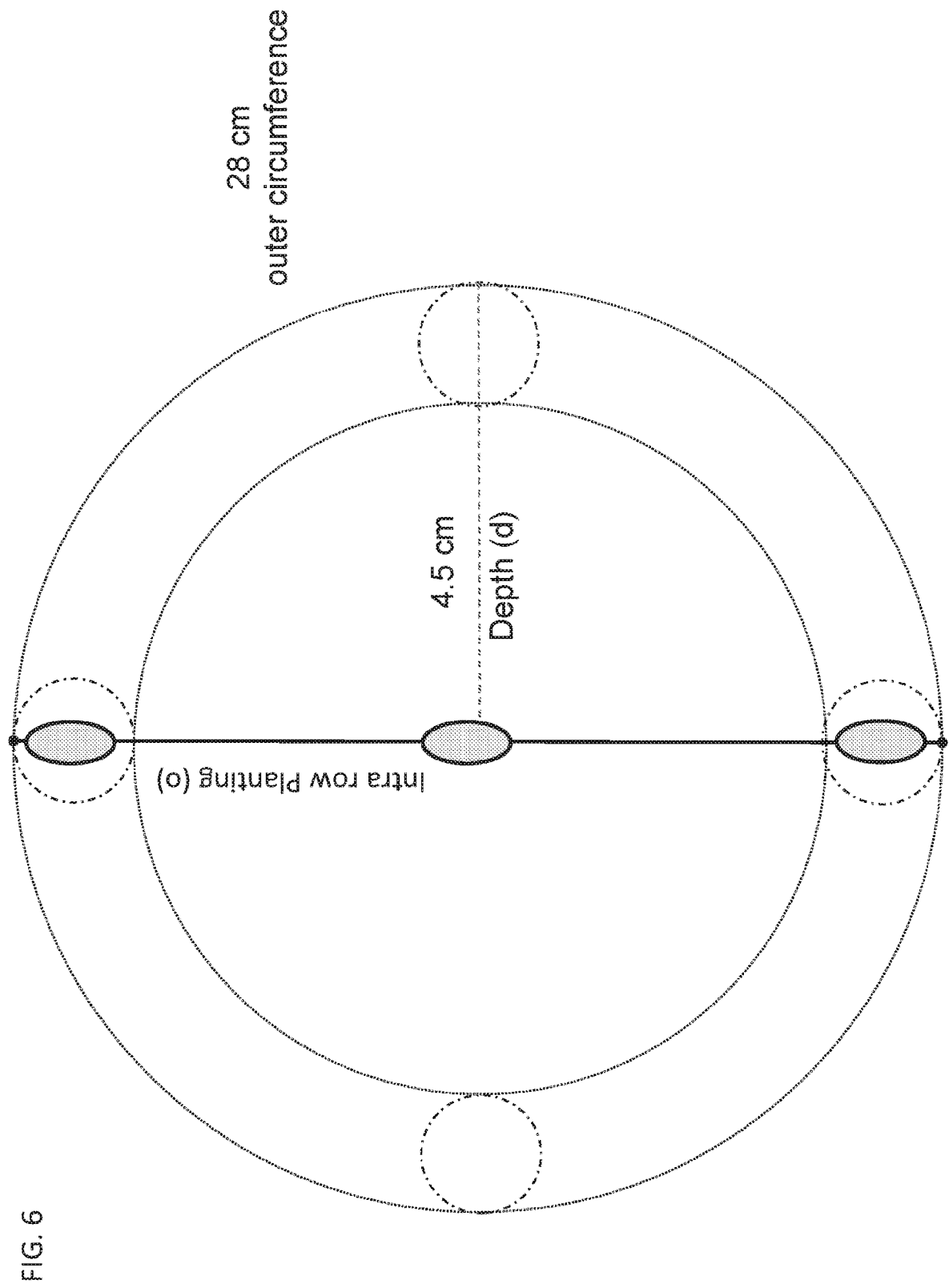
FIG. 6 depicts of a bangle used for planting crops.

Bangles were also created to enable farmers to plant soy, wheat, rice, lettuce, and tomatoes. A schematic of the bangles is depicted in FIG. 6. The geometry associated with the design of the bangles can be utilized to help farmers grow plants from seeds. Precise measurements for the bangles are found in Table 1 and Table 2.

The bangles consist of a solid band, made from a variety of materials, including metals, fabrics, or plastics, which have an inner and outer circumference. Similar to the bracelet of Example 2, the bangle will be stained with ink or wrapped with pieces of fabric at 0°, 90°, 180°, and 270°.

Similar to the bracelet, seeds are placed in the center of the bracelet and proximal to the ink or fabric at the outer circumference 90° and 270° as shown FIG. 6. The distance between the center of the bracelet and ink on the outside of the bracelet is the intrarow planting parameter (o). This distance is also the depth (d) of planting a seed in drought conditions. For soy, wheat, rice, lettuce, and tomatoes, the depth of planting (d) is 4.5 cm. In drought conditions, the inner diameter is utilized to calculate the depth of planting. The inner diameter is 6.5 cm.

The spacing between the fabric or ink reflects the distance for watering and adding fertilizer, or the water/fertilizer parameter (wf), as shown in FIG. 5. After three seeds are planted in the soil, as in FIG. 5, the bracelet is placed on top of the seed, such that one seed is in the middle of the bracelet, and additional seeds are proximal to the jewels at 90° and 270°. Water and fertilizer is added between the seeds at the position of the jewels, which are equivalent to the position of the ink or fabric.

Example 4. Lariat Necklaces for Planting Crops from Seeds and Slips

Figure 7:
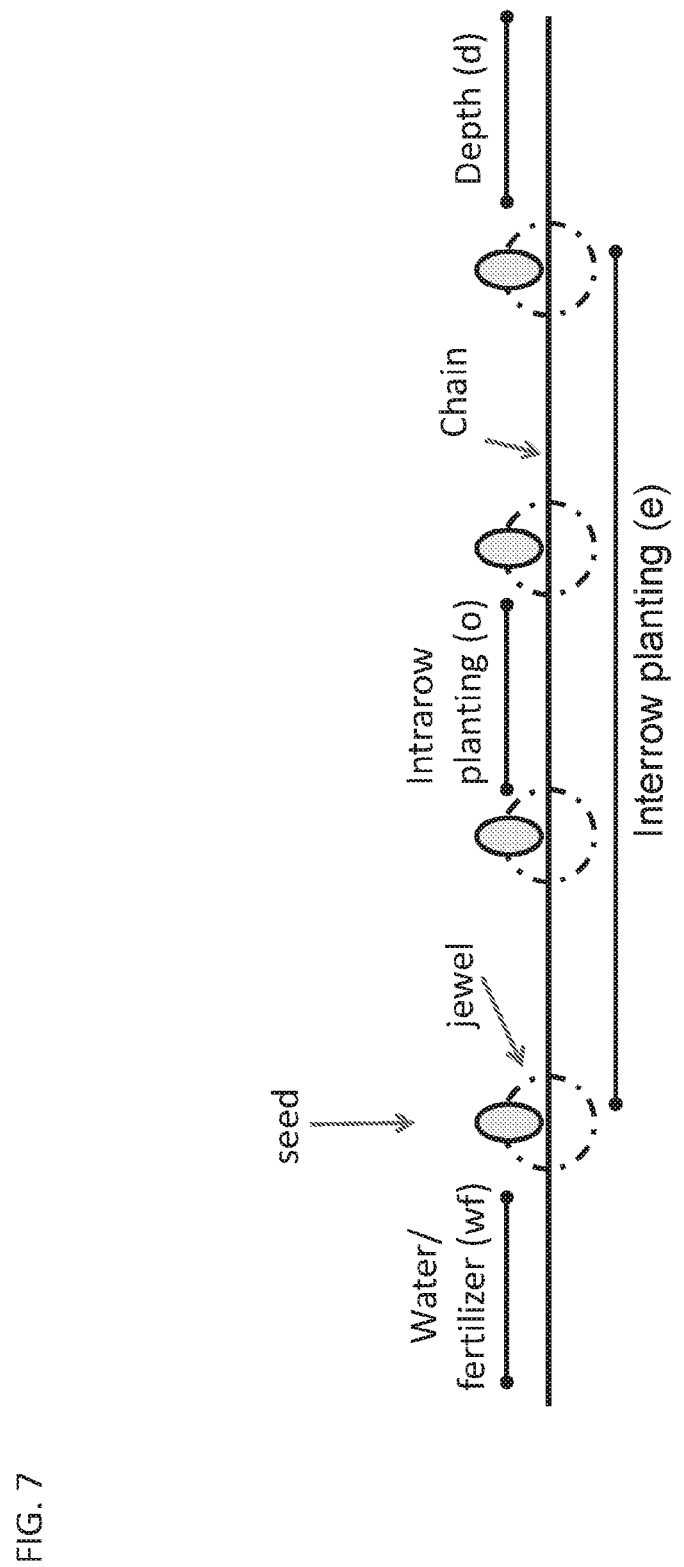
FIG. 7 depicts a schematic of a lariat necklace used to plant crops.
Figure 8:
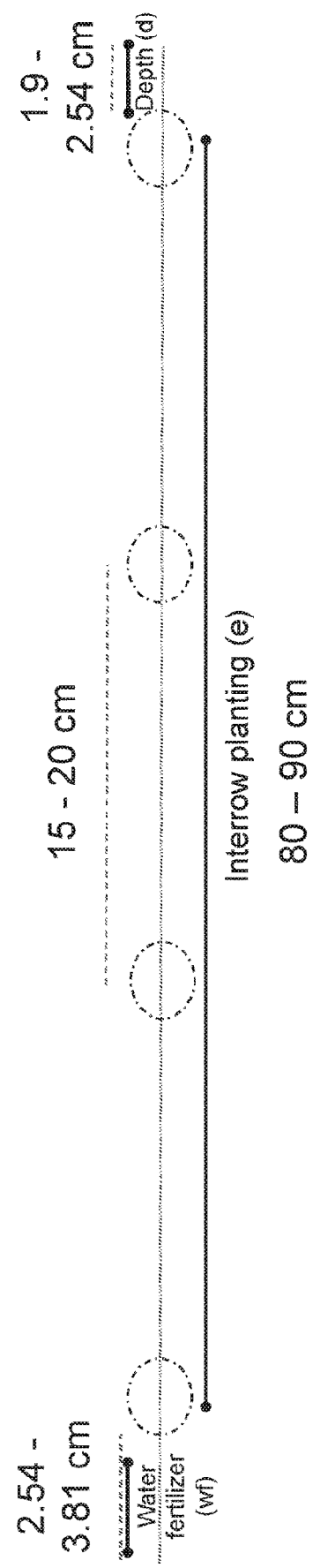
FIG. 8 depicts a schematic of a lariat necklace used to plant sweet corn.
Figure 9:
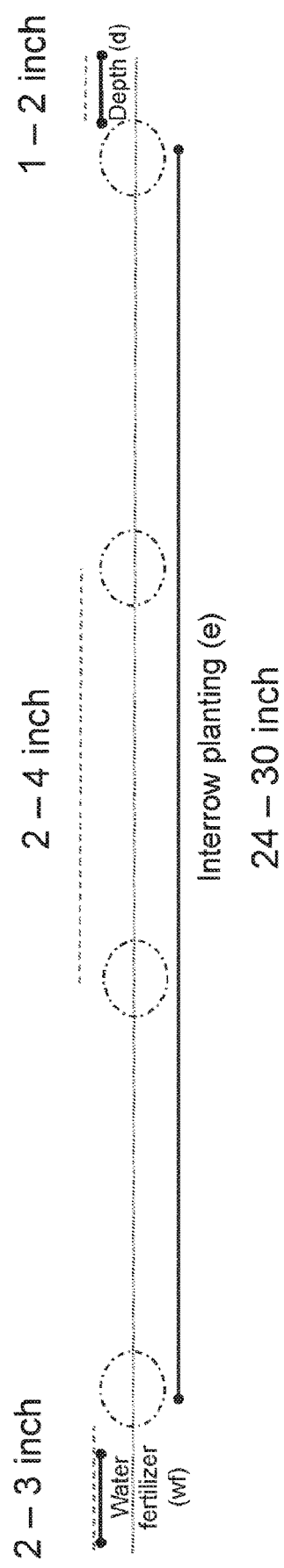
FIG. 9 depicts a schematic of a lariat necklace used to plant soy beans.
Figure 13:
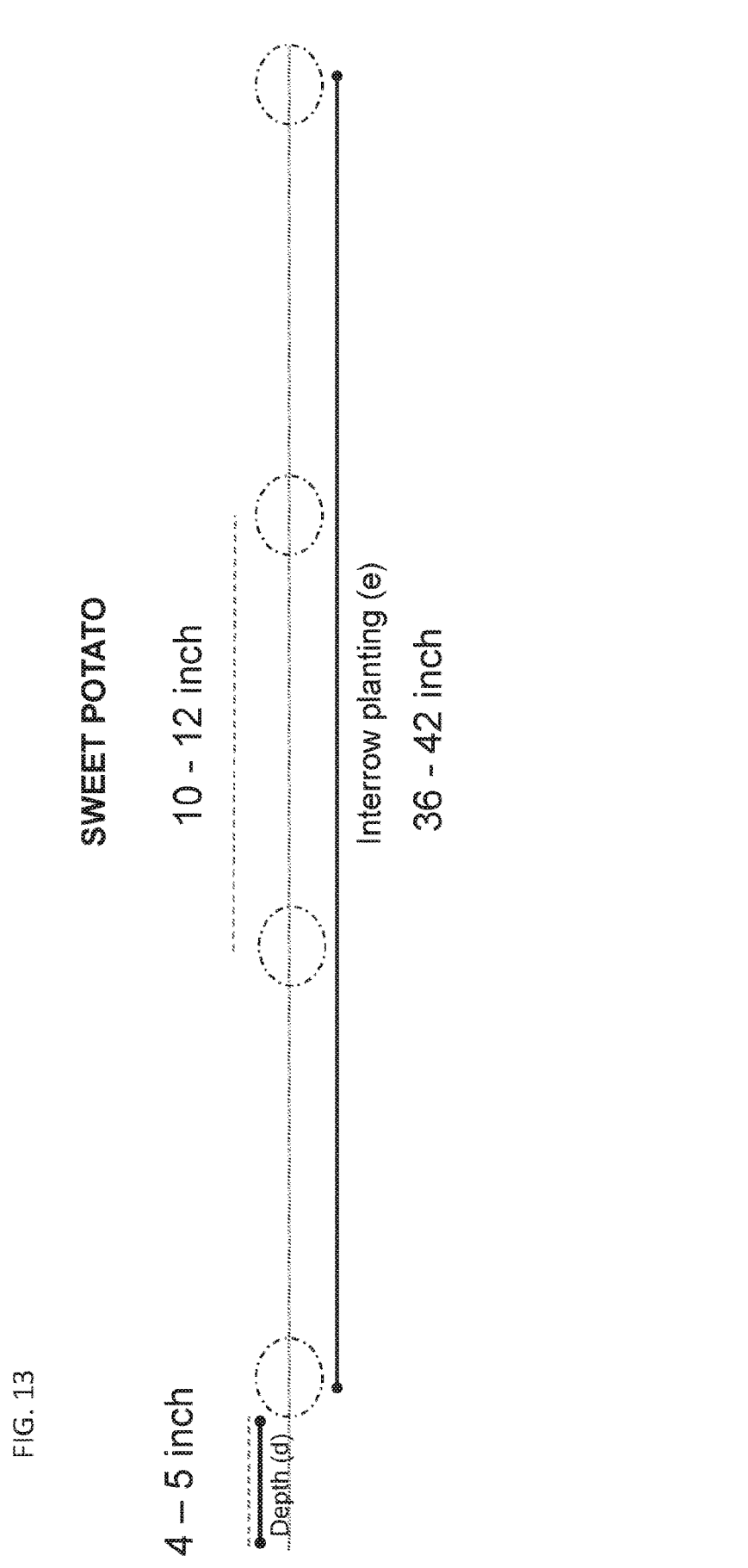
FIG. 13 depicts a schematic of a lariat necklace used to plant sweet potatoes.
Figure 18:
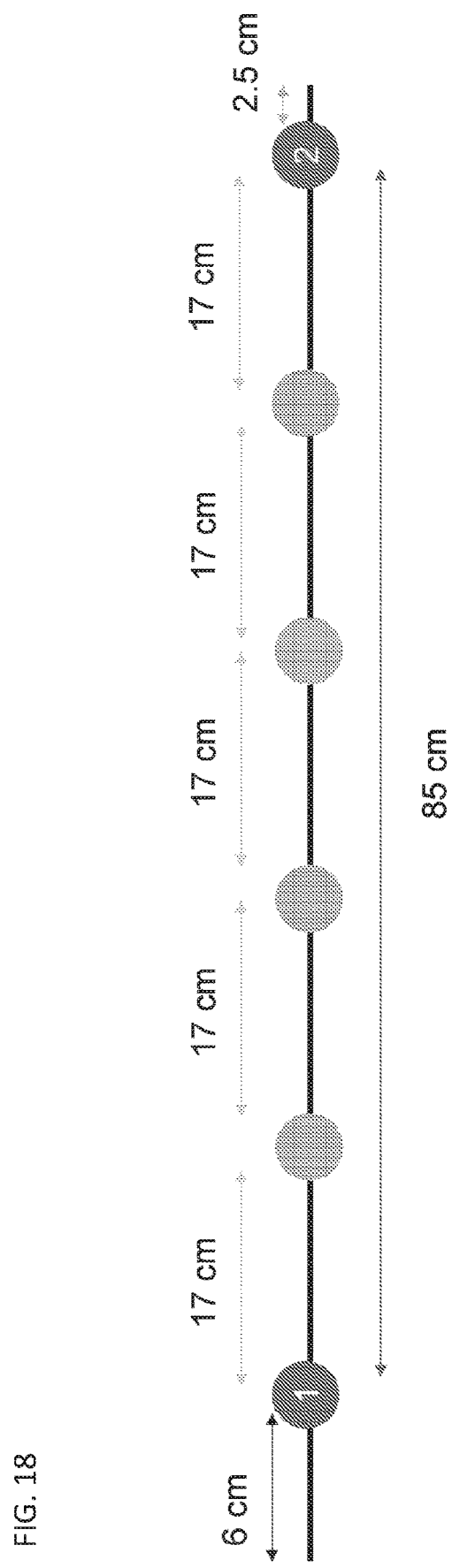
FIG. 18 depicts a schematic of a prototype for planting corn with a lariat necklace.
Figure 19:
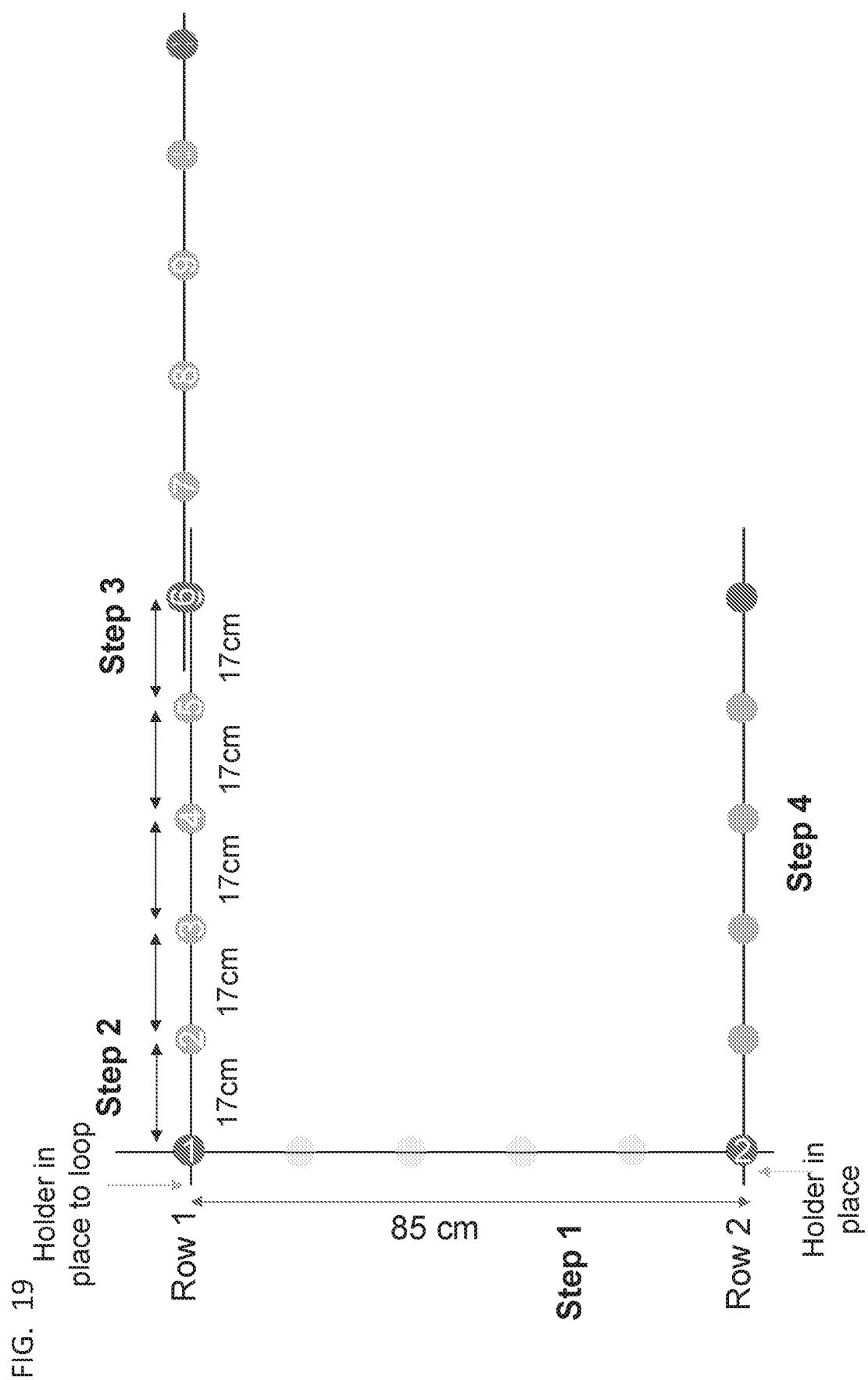
FIG. 19 shows how to use the lariat necklace to plant corn. In the first step, the lariat necklace is used to mark out rows. The distance between rows is the length between the terminal beads. In the second step, the lariat is placed horizontally right below the first row, and seeds are planted at the positions of the beads within the lariat, identified 1, 2, 3, 4, 5, and 6. In step 3, the lariat is used to plant additional seeds in row 1. The lariat is moved horizontally such that the first bead is placed horizontally below the sixth seed. Additional seeds are planted at the positions of the beads in the lariat, identified 7, 8, 9, 10, and 11. This process may be repeated. In step 4, the second row is planted as the first row was planted in steps 2 and 3. This process may be repeated for more than two rows. The length of the lariat from a terminal bead to the end of the lariat chain which is closest to the terminal bead represents either the water fertilizer parameter or the depth parameter. The longer length is the depth parameter, which is 6 cm in dry solids. The shorter length is the water fertilizer parameter, which is 2.5 cm.

Lariat necklaces were generated to help farmers plant seeds and tubers. A schematic of the lariat necklaces for planting is depicted in FIG. 7. The geometry associated with the design of the lariat necklaces can be utilized to help farmers grow plants from seeds. FIG. 19 shows how the lariat necklaces can be utilized to plant seeds. Precise measurements for the lariat necklaces are found in Table 3 and Table 4. The lariat necklaces consist of a lariat chain, a post, and jewels. A schematic of how the lariat necklaces can be utilized for planting sweet corn, soy beans, rice, wheat, and potatoes are depicted in FIG. 8, FIG. 9, FIG. 10, and FIG. 11, and FIG. 12 respectively. A schematic of how the lariat necklaces can be utilized to plant sweet potatoes from slips is shown in FIG. 13. A prototype of a lariat necklace used to plant corn is shown in FIG. 18, where the intrarow planting parameter (o) is 17 cm, the interrow planting parameter (e) is 85 cm, the water fertilizer parameter (wf) is 2.5 cm, and the depth of planting (d) is 6 cm.

The spacing of the jewels reflects intrarow planting (o), or the spacing in which seeds in a row are planted as shown in FIG. 7.

Figure 10:
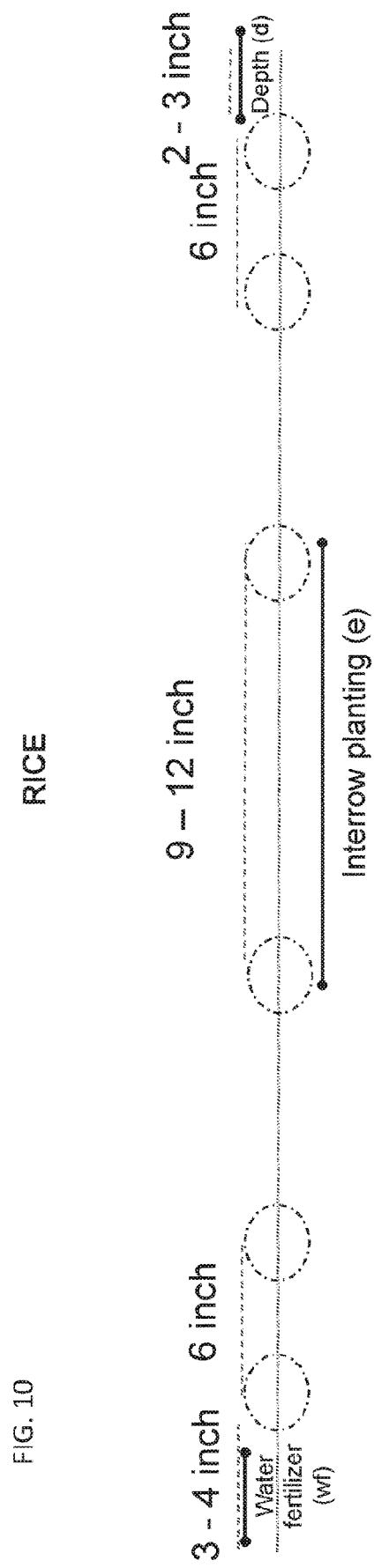
FIG. 10 depicts a schematic of a lariat necklace used to plant rice.
Figure 11:
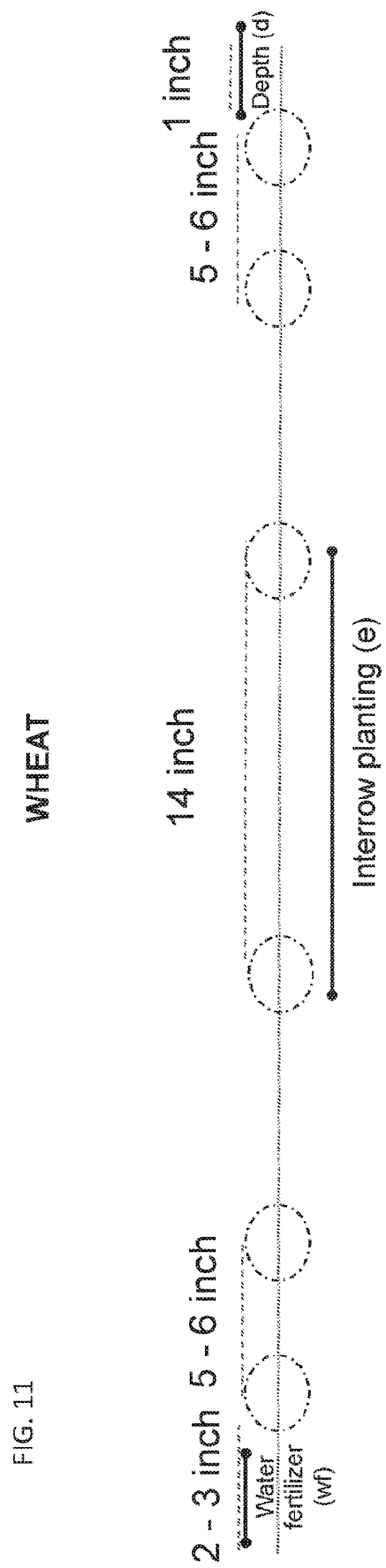
FIG. 11 depicts a schematic of a lariat necklace used to plant wheat.
Figure 12:
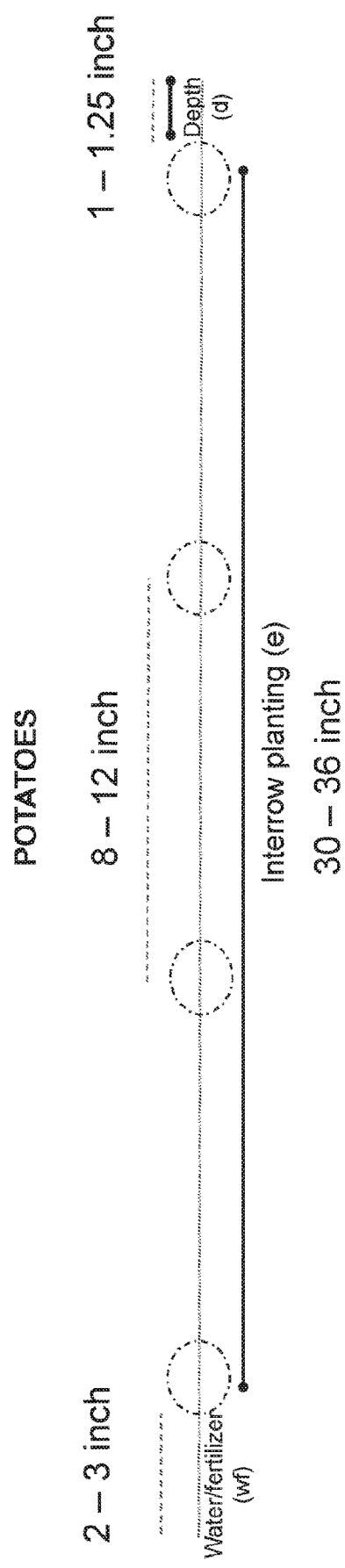
FIG. 12 depicts a schematic of a lariat necklace used to plant potatoes.

Lariat necklaces can be utilized to direct interrow planting (e). The interrow planting parameter is defined as the length of the chain between the first and last jewel, when the lariat necklace is unclasped for planting corn, soy beans, potatoes, and sweet potatoes, as shown in FIG. 8, FIG. 9, FIG. 12, and FIG. 13. By rotating the lariat necklace 90° from the previous row, the next row of seeds can be planted. The interrow planting parameter for planting rice and wheat is defined as the largest distance between the jewels, as shown in FIG. 10 and FIG. 11.

When the lariat necklaces are unclasped, the lariat necklaces contain two free ends, one of which directs the depth of planting (d) and the other, which directs the distance at which to add water and fertilizer (wf), as shown in FIG. 7. The end that is furthest from the clasp directs depth of planting. The end, which is closest to the clasp directs the distance at which to add water and fertilizer.

For sweet potatoes, there is no water/fertilizer parameter (wf), but the depth of planting (d) refers to the distance to plant the sweet potato slips, which is 10.2-12.7 cm.

Table 3 reflects the measurements of the lariat necklace for each of the aforementioned crops.

TABLE 1

Jewelry parameters, which define growing factors for maize under normal environmental conditions

| Parameter | Earrings | Bracelet/ Bangle | Lariat Necklace | Lariat Bracelet |
|---|---|---|---|---|
| Size of bead (s) | 0.2-3 | 0.2-3 | 0.2-3 | 0.2-3 |
| Depth (d) (cm) | 2.5-4 | 4.5 | 2.5-4 | 2.5-4 |
| Intrarow planting (o) (cm) | N/A | 4.5 | 20-30 | 20-30 |
| Interrow planting (e) (cm) | N/A | N/A | 75-90 | 75-90 |
| Circumference (c) (cm) | 15.7-25.1 | 28.3 | N/A | N/A |
| Water/fertilizer (wf) (cm) | N/A | 1-10 | 3-5 | 3-5 |

TABLE 2

Jewelry parameters, which define growing factors for maize under drought conditions

| Parameter | Earrings | Bracelet/ Bangle | Lariat Necklace | Lariat Bracelet |
|---|---|---|---|---|
| Size of bead (s) | 0.2-3 | 0.2-3 | 0.2-3 | 0.2-3 |
| Depth (d) (cm) | 7.5-11 | 6.5 | 7.5-11 | 7.5-11 |
| Intrarow planting (o) (cm) | N/A | 3.75 | 20-30 | 20-30 |
| Interrow planting (e) (cm) | N/A | N/A | 75-90 | 75-90 |
| Circumference (c) (cm) | 47.1-69.1 | 40.8 | N/A | N/A |
| Water/fertilizer (wf) (cm) | N/A | 1-10 | 2-4 | 2-4 |

TABLE 3

Parameters for lariat necklace, which define growing factors for crops grown from seeds during drought and non-drought conditions

| Crop | Size of bead (s) | Depth (d) (cm) | Intrarow planting (o) (cm) | Interrow planting (e) (cm) | Circumference (c) (cm) | Water/ fertilizer (wf) (cm) |
|---|---|---|---|---|---|---|
| Beets | 0.15-3 | 2.0-8.0 | 5-10 | 16-20 | 15.7-70.0 | 2.5-10.5 |
| Broccoli | 0.15-3 | 2.0-8.0 | 12-20 | 27-35 | 15.7-70.0 | 2.5-10.5 |
| Cabbage | 0.15-3 | 2.0-8.0 | 35-45 | 35-45 | 15.7-70.0 | 2.5-10.5 |
| Carrots | 0.15-3 | 2.0-8.0 | 6-14 | 10-18 | 15.7-70.0 | 2.5-10.5 |
| Celery | 0.15-3 | 2.0-8.0 | 25-30 | 25-30 | 15.7-70.0 | 2.5-10.5 |
| Chufa | 0.15-3 | 2.0-8.0 | 15.24-20.32 | 91.44-106.68 | 15.7-70.0 | 2.5-10.5 |
| Corn | 0.15-3 | 2.0-8.0 | 15.0-25 | 70-90 | 15.7-70.0 | 2.5-10.5 |
| Cotton | 0.15-3 | 2.0-8.0 | 5-8 | 90-107 | 15.7-70.0 | 2.5-10.5 |
| Cowpea | 0.15-3 | 2.0-8.0 | 2.54-5 | 60.96-76.2 | 15.7-70.0 | 2.5-10.5 |
| Fava beans | 0.15-3 | 2.0-8.0 | 7-11 | 40-50 | 15.7-70.0 | 2.5-10.5 |
| Green beans | 0.15-3 | 2.0-8.0 | 4-8 | 40-50 | 15.7-70.0 | 2.5-10.5 |
| Kenaf | 0.15-3 | 2.0-8.0 | 5.08-5.08 | 91.44-96.52 | 15.7-70.0 | 2.5-10.5 |
| Leeks | 0.15-3 | 2.0-8.0 | 10-20 | 25-35 | 15.7-70.0 | 2.5-10.5 |
| Lettuce | 0.15-3 | 2.0-8.0 | 2.5-20/30 | 13-23/30 | 15.7-70.0 | 2.5-10.5 |
| Lupine Blue, yellow | 0.15-3 | 2.0-8.0 | 2.54-5.08 | 53.34-106.68 | 15.7-70.0 | 2.5-10.5 |
| Maize | 0.15-3 | 2.0-8.0 | 20-30 | 75-90 | 15.7-70.0 | 2.5-10.5 |
| Onions | 0.15-3 | 2.0-8.0 | 2-4 | 30-35 | 15.7-70.0 | 2.5-10.5 |
| Parsnips | 0.15-3 | 2.0-8.0 | 8-15 | 19-30 | 15.7-70.0 | 2.5-10.5 |
| Peanut runners | 0.15-3 | 2.0-8.0 | 5.08-7.62 | 76.2-91.44 | 15.7-70.0 | 2.5-10.5 |
| Peas | 0.15-3 | 2.0-8.0 | 9-15 | 41-51 | 15.7-70.0 | 2.5-10.5 |
| Pigion pea | 0.15-3 | 2.0-8.0 | 10.16-12.7 | 91.44-96.52 | 15.7-70.0 | 2.5-10.5 |
| Potato | 0.15-3 | 2.0-8.0 | 20-30.5 | 76-92 | 15.7-70.0 | 2.5-10.5 |
| Rice | 0.15-3 | 2.0-8.0 | 15-20 | 22-30.5 | 15.7-70.0 | 2.5-10.5 |
| Sorghum | 0.15-3 | 2.0-8.0 | 5.08-10.16 | 50.8-91.44 | 15.7-70.0 | 2.5-10.5 |
| Sorghum grain | 0.15-3 | 2.0-8.0 | 5.08-7.62 | 50.8-91.44 | 15.7-70.0 | 2.5-10.5 |
| Sorghum sillage | 0.15-3 | 2.0-8.0 | 7.62-10.16 | 50.8-91.44 | 15.7-70.0 | 2.5-10.5 |
| Sorghum x sudangrass | 0.15-3 | 2.0-8.0 | — | 53.34-106.68 | 15.7-70.0 | 2.5-10.5 |
| Soybean | 0.15-3 | 2.0-8.0 | 15.24-20.32 | 76.2-91.44 | 15.7-70.0 | 2.5-10.5 |
| Sunflower | 0.15-3 | 2.0-8.0 | 15.24-20.32 | 91.44-96.52 | 15.7-70.0 | 2.5-10.5 |
| Sweet Potato | 0.15-3 | 10.0-12.0 | 25-30 | 91-107 | 15.7-70.0 | 2.5-10.5 |
| Tomatoes | 0.15-3 | 2.0-8.0 | 15-20 | 15-20 | 15.7-70.0 | 2.5-10.5 |
| Velvetbean | 0.15-3 | 2.0-8.0 | 60.96-182.88 | 91.44-106.68 | 15.7-70.0 | 2.5-10.5 |
| Watermelon | 0.15-3 | 2.0-8.0 | 15-215 | 168-180 | 15.7-70.0 | 2.5-10.5 |
| Wheat | 0.15-3 | 2.0-8.0 | 10-16 | 31-39 | 15.7-70.0 | 2.5-10.5 |

TABLE 4

Parameters for lariat necklace, which define
growing conditions for sweet potatoes from slips,
during drought and non-drought conditions

| Parameter | Sweet potato |
|---|---|
| Size of bead (s) | 0.2-3 |
| Depth (d) (cm) | 10.2-12.7 |
| Intrarow planting (o) (cm) | 25.4-30.5 |
| Interrow planting (e) (cm) | 91.4-106.7 |
| Circumference (c) (cm) | N/A |
| Water/fertilizer (wf) (cm) | N/A |

NUMBERED EMBODIMENTS OF THE DISCLOSURE

Notwithstanding the appended embodiments, the disclosure sets forth the following numbered embodiments:

1. Jewelry for planting crops, comprising:
    (a) a post, used to fasten jewelry to a body part;
    (b) markings adorning the jewelry at defined distances that specify how to plant crops; and
    (c) a support material for holding the markings.
2. The jewelry of embodiment 1, wherein said jewelry is an earring.
3. The jewelry of embodiment 1, wherein said jewelry is an earring, comprising:
    (a) a marking selected from the group consisting of jewels, seashells, and beads; and
    (b) a support material called a dangle,
    wherein the dangle connects the post to the marking, and
    wherein a length of the dangle instructs a depth (d) of planting a seed in soil.
4. The earring of embodiment 3, wherein the dangle has an optimal length for planting seeds in drought.
5. The earring of embodiment 3, wherein the dangle has an optimal length for planting seeds.
6. The earring of embodiment 3, wherein the dangle has a length between 2.5 and 11 cm.
7. The earring of embodiment 3, wherein the length of the dangle serves as the radius of a circle with a circumference (C); and
    wherein the circumference defines where to add water and fertilizer to the soil.
8. The earring of embodiment 2 or 3, wherein said earring is utilized to plant tomatoes, carrots, rice, soy beans, and wheat.
9. A method for planting using the earring of embodiment 3, comprising: utilizing the dangle to plant a seed at a depth (d) in the soil.
10. The method of embodiment 9, wherein the dangle has an optimal length for planting seeds in drought.
11. The method of embodiment 9, wherein the dangle has an optimal length for planting seeds.
12. The method of embodiment 9, wherein the dangle has a length between 1 and 15 cm.
13. The method of embodiment 9, wherein the dangle has a length between 2.5 and 11 cm.
14. The method of embodiment 9, wherein the length of the dangle serves as the radius of a circle with a circumference (C); and
    wherein the circumference defines where to add water and fertilizer to the soil.
15. The jewelry of embodiment 1, wherein said jewelry is a bracelet.
16. The jewelry of embodiment 1, wherein said jewelry is a bracelet, comprising:
    (a) markings selected from the group consisting of jewels, seashells, and beads; and
    (b) a support material called a circular band,
    wherein an outer circumference is formed by drawing a circle connecting the markings protruding from the outside of the circular band, and;
    wherein an inner circumference is formed by drawing a circle connecting the markings protruding from the inside of the circular band, and;
    wherein a distance between the center of the circle and the outer circumference defines a spacing between seeds in a row called an intrarow planting parameter (o).
17. The bracelet of embodiment 16, wherein the markings are utilized to determine where to add water and fertilizer.
18. The bracelet of embodiment 16, wherein the diameter of the inner circumference instructs a depth (d) of planting a seed in soil in drought.
19. The bracelet of embodiment 16, wherein the radius of the outer circumference instructs a depth (d) for planting seeds.
20. The bracelet of embodiment 16, wherein the outer radius is between 2.5 and 7.5 cm.
21. The bracelet of embodiment 16, wherein the inner diameter is between 4.5 and 7.5 cm.
22. The bracelet of embodiment 16, wherein said bracelet is utilized to plant soy, wheat, rice, lettuce, or tomatoes.
23. A method for planting using the bracelet of embodiment 16, comprising: utilizing the markings to determine where to add water and fertilizer, and using a distance between the outer circumference and the center of the circular band as a spacing between seeds in a row called an intrarow planting parameter (o).
24. The method for planting of embodiment 23, comprising utilizing the radius of the outer circumference to plant a seed a depth (d) in soil.
25. The method for planting of embodiment 23, comprising utilizing the diameter of the inner circumference to plant a seed a depth (d) in soil in drought conditions.
26. The jewelry of embodiment 1, wherein said jewelry is a bangle.
27. The jewelry of embodiment 1, wherein said jewelry is a bangle, comprising:
    (a) markings selected from the group consisting of ink, fabric, and dye; and
    (b) a support material called a circular band, which has a thickness,
    wherein the circular band has an outer circumference and an inner circumference, and
    wherein a distance between the center of the circle and the outer circumference defines a spacing between seeds in a row called a intrarow planting parameter (o).
28. The bangle of embodiment 27, wherein the diameter of the inner circumference instructs a depth (d) of planting a seed in soil in drought.
29. The bangle of embodiment 27, wherein the radius of the outer circumference instructs a depth (d) for planting seeds.
30. The bangle of embodiment 27, wherein the outer radius is between 2.5 and 7.5 cm.
31. The bangle of embodiment 27, wherein the inner diameter is between 4.5 and 7.5 cm.
32. The bangle of embodiment 27, wherein said bangle is utilized to plant soy, wheat, rice, lettuce, or tomatoes.
33. A method for planting using the bangle of embodiment 27, comprising utilizing the markings to determine where to add water and fertilizer, and using a distance between the outer circumference and the center of the circular band as a spacing between seeds in a row called a intrarow planting parameter (o).

34. The method for planting of embodiment 33, comprising utilizing the radius of the outer circumference to plant a seed a depth (d) in soil.

35. The method for planting of embodiment 33 comprising utilizing the diameter of the inner circumference to plant a seed a depth (d) in soil in drought conditions.

36. The jewelry of embodiment 1, wherein said jewelry is a lariat necklace.

37. The jewelry of embodiment 1, wherein said jewelry is a lariat necklace, comprising:
    (a) markings selected from the group consisting of jewels, seashells, and beads; and
    (b) a support material called a chain, which has two free ends when unclasped,
    wherein a shortest distance separating adjacent markings on the chain is the intrarow planting parameter (o), and
    wherein when the lariat necklace is unclasped, a distance between the marking furthest from the post and the end of the chain defines the depth (d) at which a seed should be planted, and
    wherein a distance between the post and a first marking called the water fertilizer parameter (wf) defines a radius (r) with a circumference (C), and
    wherein the circumference defines where to add water and fertilizer to the soil.

38. The lariat necklace of embodiment 37, wherein a distance between the first and last marking defines the distance between rows of seeds called an interrow planting parameter (e).

39. The lariat necklace of embodiment 37, wherein the markings have different sizes, and wherein a distance between the two largest markings defines the distance between rows of seeds called an interrow planting parameter (e).

40. The lariat necklace of embodiment 37, wherein the water fertilizer parameter (wf) is between 1 and 15 cm.

41. The lariat necklace of embodiment 37, wherein depth of planting (d) is between 1 and 10 cm.

42. The lariat necklace of embodiment 37, wherein said lariat necklace is utilized to plant corn, soy beans, rice, wheat, and potatoes.

43. A method for planting using the lariat necklace of embodiment 37, comprising: utilizing a shortest distance between adjacent marking to determine a spacing between adjacent seeds called an intrarow planting parameter (o), and using a distance between the marking furthest from the post and the end of the chain to determine the depth (d) of planting a seed, and using a distance between the post and a first marking as a radius (r) with a circumference (C), and wherein the circumference defines where to add water and fertilizer to the soil.

44. The method for planting of embodiment 43, wherein the markings have different sizes, and wherein a distance between the two largest markings defines the distance between rows of seeds called a interrow planting parameter (e).

45. The method of planting of embodiment 43, wherein a distance between the first and last marking defines the distance between rows of seeds called the interrow planting parameter (e).

46. The jewelry of embodiment 1, wherein said jewelry is a lariat necklace, comprising:
    (a) markings selected from the group consisting of jewels, seashells, and beads; and
    (b) a support material called a chain, which has two free ends when unclasped, wherein a shortest distance separating adjacent markings on the chain is the intrarow planting parameter (o), and
    wherein when the lariat necklace is unclasped, a distance between the marking furthest from the post and the end of the chain defines the depth (d) at which a slip should be planted.

47. The necklace of embodiment 46, wherein said lariat necklace is used to plant sweet potatoes.

48. The necklace of embodiment 46, wherein said depth of planting (d) is between 8 and 14 cm.

49. A jewelry article as described herein.

50. A method of planting a crop as described herein.

51. An article of manufacture as described herein.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as, an acknowledgment or any form of suggestion that they constitute valid prior art or form part of the common general knowledge in any country in the world.

What is claimed is:

1. An article of manufacture fashioned as jewelry for planting crops, wherein said jewelry is an earring, comprising:
    (a) a post, used to fasten the jewelry to a body part;
    (b) a marking adorning the jewelry at defined distances that specifies how to plant a crop, wherein the marking is selected from the group consisting of a jewel, a seashell, and a bead; and
    (c) a support material for holding the marking, wherein the support material is a dangle,
    wherein the dangle connects the post to the marking, and
    wherein a length of the dangle instructs a depth (d) of planting a seed in soil.

2. The article of manufacture of claim 1, wherein the length of the dangle is between 2.5 and 11 cm.

3. The article of manufacture of claim 1, wherein the length of the dangle serves as the radius of a circle with a circumference (C); and
    wherein the circumference defines where to add water and fertilizer to the soil.

4. A method for planting a seed, comprising: utilizing the article of manufacture of claim 1 to plant the seed at a depth (d) in the soil.

5. An article of manufacture fashioned as jewelry for planting crops, wherein said jewelry is a bracelet, comprising:
    (a) a post, used to fasten the jewelry to a body part;
    (b) a marking adorning the jewelry at defined distances that specifies how to plant a crop, wherein the marking is selected from the group consisting of a jewel, a seashell, and a bead; and
    (c) a support material for holding the marking, wherein the support material is a circular band,
    wherein an outer circumference is formed by drawing a circle connecting the marking protruding from the outside of the circular band, and
    wherein an inner circumference is formed by drawing a circle connecting the marking protruding from the inside of the circular band, and wherein a distance between the center of the circle and the outer circumference defines a spacing between seeds in a row called an intrarow planting parameter (o).

6. The article of manufacture of claim 5, wherein the marking is utilized to determine where to add water and fertilizer.

7. The article of manufacture of claim 5, wherein the diameter of the inner circumference instructs a depth (d) of planting a seed in soil in drought.

8. The article of manufacture of claim 5, wherein the radius of the outer circumference instructs a depth (d) for planting seeds.

9. The article of manufacture of claim 5, wherein said bracelet is utilized to plant soy, wheat, rice, lettuce, or tomatoes.

10. A method for planting a seed, comprising: utilizing the article of manufacture of claim 5, wherein the marking determines where to add water and fertilizer, and using a distance between the outer circumference and the center of the circular band as a spacing between seeds in a row called an intrarow planting parameter (o).

11. An article of manufacture fashioned as jewelry for planting crops, wherein said jewelry is a bangle, comprising:
  (a) a post, used to fasten the jewelry to a body part;
  (b) a marking adorning the jewelry at defined distances that specifies how to plant a crop, wherein the marking is selected from the group consisting of ink, fabric, and dye; and
  (c) a support material for holding the marking, wherein the support material is a circular band, which has a thickness,
  wherein the circular band has an outer circumference and an inner circumference, and
  wherein a distance between the center of the circle and the outer circumference defines a spacing between seeds in a row called a intrarow planting parameter (o).

12. The article of manufacture of claim 11, wherein the diameter of the inner circumference instructs a depth (d) of planting a seed in soil in drought.

13. The article of manufacture of claim 11, wherein the radius of the outer circumference instructs a depth (d) for planting seeds.

14. A method for planting a seed, comprising using the article of manufacture of claim 11, wherein the marking determines where to add water and fertilizer, and a distance between the outer circumference and the center of the circular band called a intrarow planting parameter (o) is used to determine the spacing between seeds in a row.

15. An article of manufacture fashioned as jewelry for planting crops, wherein said jewelry is a lariat necklace, comprising:
  (a) a post, used to fasten the jewelry to a body part;
  (b) a marking adorning the jewelry at defined distances that specifies how to plant a crop, wherein the marking is selected from the group consisting of a jewel, a seashell, and a bead; and
  (c) a support material for holding the marking, wherein the support material is a chain, which has two free ends when unclasped,
  wherein a shortest distance separating adjacent markings on the chain is the intrarow planting parameter (o), and
  wherein when the lariat necklace is unclasped, a distance between the marking furthest from the post and the end of the chain defines the depth (d) at which a seed should be planted, and
  wherein a distance between the post and a first marking called the water fertilizer parameter (wf) defines a radius (r) with a circumference (C), and
  wherein the circumference defines where to add water and fertilizer to the soil.

16. The article of manufacture of claim 15, wherein a distance between the first and last marking defines the distance between rows of seeds called an interrow planting parameter (e).

17. The article of manufacture of claim 15, wherein the markings have different sizes, and
  wherein a distance between the two largest markings defines the distance between rows of seeds called an interrow planting parameter (e).

18. A method for planting a seed, comprising: using the article of manufacture of claim 15, wherein
  a shortest distance between adjacent markings is used to determine a spacing between adjacent seeds called an intrarow planting parameter (o), and
  a distance between the marking furthest from the post and the end of the chain is used to determine the depth (d) of planting a seed, and
  a distance between the post and a first marking defines a radius (r) of a circle with a circumference (C), and
  wherein the circumference defines where to add water and fertilizer to the soil.

19. An article of manufacture fashioned as jewelry for planting crops, wherein said jewelry is a lariat necklace, comprising:
  (a) a post, used to fasten the jewelry to a body part;
  (b) a marking adorning the jewelry at defined distances that specifies how to plant a crop, wherein the marking is selected from the group consisting of a jewel, a seashell, and a bead; and
  (c) a support material called a chain, which has two free ends when unclasped,
  wherein a shortest distance separating adjacent markings on the chain is the intrarow planting parameter (o), and
  wherein when the lariat necklace is unclasped, a distance between the marking furthest from the post and the end of the chain defines the depth (d) at which a slip should be planted.

* * * * *